United States Patent
Kageyama

(10) Patent No.: US 11,157,775 B2
(45) Date of Patent: Oct. 26, 2021

(54) COMPUTER, NEURAL NETWORK CONSTRUCTION METHOD, AND COMPUTER SYSTEM

(71) Applicant: Hitachi, Ltd., Tokyo (JP)

(72) Inventor: Masahiro Kageyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 119 days.

(21) Appl. No.: 16/669,726

(22) Filed: Oct. 31, 2019

(65) Prior Publication Data
US 2020/0160118 A1    May 21, 2020

(30) Foreign Application Priority Data
Nov. 15, 2018    (JP) .............................. JP2018-214275

(51) Int. Cl.
G06K 9/62       (2006.01)
G06N 3/08       (2006.01)
G06N 3/04       (2006.01)

(52) U.S. Cl.
CPC ............. G06K 9/6262 (2013.01); G06N 3/04 (2013.01); G06N 3/084 (2013.01)

(58) Field of Classification Search
CPC .. G06K 9/6262; G06K 9/6267; G06K 9/4628; G06N 3/084; G06N 3/04; G06N 3/0454; G06N 3/0481; G06N 3/063; G06N 3/082
USPC ........................................................ 382/157
See application file for complete search history.

(56) References Cited

U.S. PATENT DOCUMENTS

| | | | |
|---|---|---|---|
| 2020/0285939 A1* | 9/2020 | Baker | ...................... G06N 3/04 |
| 2020/0320371 A1* | 10/2020 | Baker | .................... G06N 3/063 |
| 2020/0380341 A1* | 12/2020 | Lie | ...................... G06F 9/30087 |

FOREIGN PATENT DOCUMENTS

JP        2015-052832 A        3/2015

OTHER PUBLICATIONS

Geoffrey E. Hinton, et al., "A fast learning algorithm for deep belief nets", Neural Computation, vol. 18, pp. 1527-1544, 2006.

* cited by examiner

*Primary Examiner* — Juan A Torres
(74) *Attorney, Agent, or Firm* — Mattingly & Malur, PC

(57) ABSTRACT

A computer constructs a neural network for executing image processing, the neural network being constituted of layers, each of which includes at least one node. The neural network includes a detection layer that realizes a process for detecting an object in an image. The computer is configured to execute: a first process of obtaining setting information for constructing the neural network including setting values relating to characteristics of a boundary of the object and a shape of the object, the setting values being values for calculating hyperparameters of the detection layer; a second process of constructing the neural network on the basis of the setting information. The second process includes a process of calculating the hyperparameters of the detection layer on the basis of the setting values.

12 Claims, 14 Drawing Sheets

|     (a)    |     (b)    |     (c)    |     (d)    |
|:----------:|:----------:|:----------:|:----------:|
| 0  0  0    | 0  0  1    | 0  1  0    | 1  0  0    |
| -1 0  1    | 0  0  0    | 0  0  0    | 0  0  0    |
| 0  0  0    | -1 0  0    | 0 -1  0    | 0  0 -1    |

|     (e)    |     (f)    |     (g)    |     (h)    |
|:----------:|:----------:|:----------:|:----------:|
| 0  0  0    | 0  0 -1    | 0 -1  0    | -1 0  0    |
| 1  0 -1    | 0  0  0    | 0  0  0    | 0  0  0    |
| 0  0  0    | 1  0  0    | 0  1  0    | 0  0  1    |

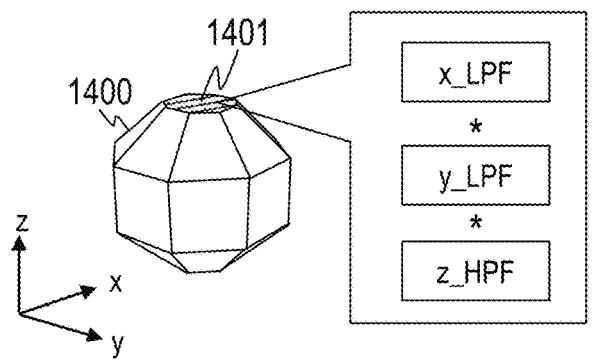
FIG. 14
|  (a)      |  (b)    |  (c)    |
|-----------|---------|---------|
| -1 -2 -1  | 0 0 0   | 1 2 1   |
| -2 -4 -2  | 0 0 0   | 2 4 2   |
| -1 -2 -1  | 0 0 0   | 1 2 1   |
FIG. 15
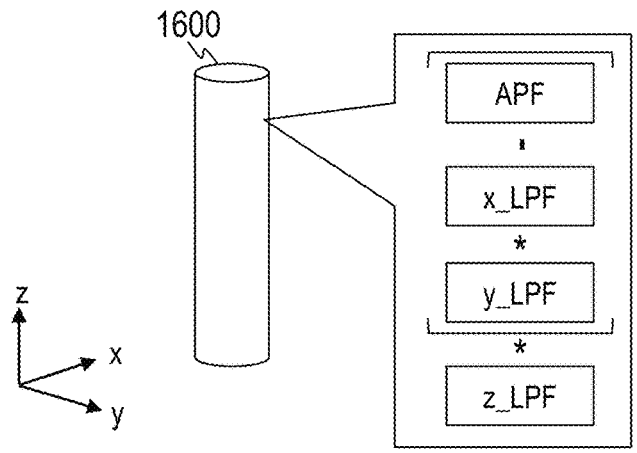
FIG. 16
|  (a)      |  (b)      |  (c)      |
|-----------|-----------|-----------|
| -1 -2 -1  | -2 -4 -2  | -1 -2 -1  |
| -2 12 -2  | -4 24 -4  | -2 12 -2  |
| -1 -2 -1  | -2 -4 -2  | -1 -2 -1  |
FIG. 17

COMPUTER, NEURAL NETWORK CONSTRUCTION METHOD, AND COMPUTER SYSTEM

CLAIM OF PRIORITY

The present application claims priority from Japanese patent application JP 2018-214275 filed on Nov. 15, 2018, the content of which is hereby incorporated by reference into this application.

BACKGROUND OF THE INVENTION

The present invention relates to the setting of hyperparameters of a neural network for learning.

In recent years, convolutional neural networks (hereinafter referred to as CNNs), which are a core technology for deep learning, are used in various fields. CNNs are structured so as to include layers constituted of one or more nodes, with the connections between the nodes of the various layers forming a network. Layers included in the CNN include at least one layer on which a convolution operation is executed.

In the medical field, for example, CNNs that process CT (computer tomography) images, MRI (magnetic resonance imaging) images, X-ray images, ultrasound images, and the like are used for high accuracy detection of pathologies, automatic measurement of pathologies, generation of reports for pathologies, and the like. Also, CNNs that process images from surveillance cameras, household video cameras, mobile phones, or the like are used to detect a subject such as a person from the image, or recognize text, characters, graphs, figures, and the like from the image.

Hyperparameters constitute one factor that greatly affects the processing performance of neural networks such as CNNs. Hyperparameters are parameters for constructing the neural network, and need to be set by the designer prior to the start of the learning process. There are various types of hyperparameters. Examples thereof include the number of layers constituting the CNN, the number of nodes in each layer, the initial values of parameters such as a convolutional weighting coefficient, the selection of an optimizer (updating algorithm for parameters), the learning rate (rate at which parameters are updated for each round of learning), and the like.

How hyperparameters affect the processing performance of the CNNs that have learned the hyperparameters has not been clearly found in a systematic manner, and thus, the processing performance of CNNs greatly depend on the know-how or the like of the designer.

During construction of CNNs according to a conventional technique, a learning apparatus sets hyperparameters by trial and error on the basis of the know-how or the like of the designer, or using random numbers, and executes a learning process for attaining a global optimum solution. However, if the setting of the hyperparameters is unsuitable, then during the learning process, only a local optimum solution is attained and learning does not progress any further, preventing a high processing performance CNN from being attained.

Thus, in actual development of CNNs, a large amount of time is allocated to adjusting the hyperparameters in order to realize high processing performance. Therefore, it is difficult for beginner designers to construct a high processing performance CNN, and even experienced individuals would be required to undertake a process of repeated trial and error in adjusting the hyperparameters.

Methods for designing hyperparameters include JP 2015-52832 A (Patent Document 1) and G. E. Hinton et al. "A fast learning algorithm for deep belief nets, Neural Computation," Vol. 18, pp. 1527-1544 (2006) (Non-Patent Document 1).

In Patent Document 1, relying on the fact that Fisher weight maps can be analytically solved as a generalized eigenvalue problem, upper level eigenvectors are used to determine the Fisher weight map, a number of the upper level eigenvectors is the same as the number of neurons to be extracted as an intermediate layer, thereby constructing a convolution layer in a simple manner.

Also, Non-Patent Document 1 indicates that by executing unsupervised learning for each partial layer in a multilayer network structure and performing "pretraining" the same number of times as the number of layers, learning can be executed well even in a multilayer structure.

SUMMARY OF THE INVENTION

In the methods disclosed in Patent Document 1 and Non-Patent Document 1, aside from the hyperparameters for the CNN to be developed, it is also necessary to simultaneously develop techniques such as a Fisher weighting map and pretraining, which results in extra steps and a high level of difficulty for beginner designers. Thus, the development of a technique for setting hyperparameters in a simple manner is desired.

The present invention was made in view of the aforementioned problem. That is, the present invention provides a technique for easily setting hyperparameters for a CNN that processes images, and in particular, a CNN that includes a process for detecting objects in an image. The present invention also provides techniques (device and method) for easily setting the values of the hyperparameters of the CNN, and provides a system configured by such techniques.

A representative example of the present invention disclosed in this specification is as follows: a computer constructs a neural network for executing image processing, the neural network being constituted of a plurality of layers, each of which includes at least one node. The neural network includes a detection layer that realizes a process for detecting an object in an image. The computer comprises an arithmetic device, and a storage device coupled to the arithmetic device. The arithmetic device is configured to execute: a first process of obtaining setting information for constructing the neural network including a plurality of setting values relating to characteristics of a boundary of the object and a shape of the object, the plurality of setting values being values for calculating a plurality of hyperparameters of the detection layer; a second process of constructing the neural network on the basis of the setting information; and a third process of generating model information that manages a structure of the constructed neural network. The second process includes a process of calculating the plurality of hyperparameters of the detection layer on the basis of the plurality of setting values.

According to the present invention, the hyperparameters of a neural network (CNN) can be easily set. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 8 shows setting examples for hyperparameters of a boundary detection layer of Embodiment 1;

FIGS. 9 and 10 show setting examples for hyperparameters of the movement layer of Embodiment 1;

FIG. 14 shows an example of a model of a nodule detected by the CNN of Embodiment 2;

FIG. 15 shows an example of weighting coefficients set in order to detect the boundary surfaces of a nodule in Embodiment 2;

FIG. 16 shows an example of a model of a blood vessel detected by the CNN of Embodiment 2;

FIG. 17 shows an example of weighting coefficients set in order to detect the boundary surfaces of a blood vessel in Embodiment 2;

DETAILED DESCRIPTION OF EMBODIMENTS

Figure 1:
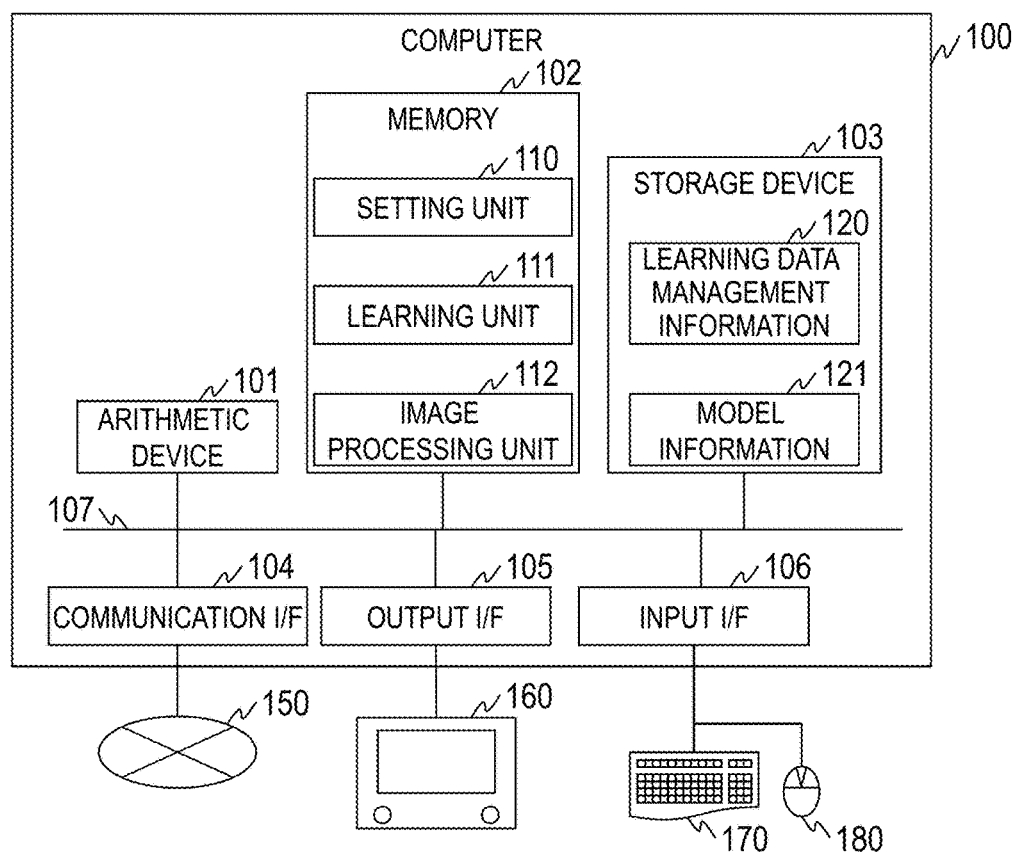
FIG. 1 shows a configuration example of a computer of Embodiment 1.

The present invention provides a technique for easily setting hyperparameters for a CNN for executing image processing including a process for detecting objects in images. In particular, the present invention provides a technique for easily setting the number of nodes in layers constituting the CNN and a node weighting coefficient.

Here, the CNN is a network which a plurality of layers constituted of a plurality of nodes are connected as will be described later. A node is an artificial neuron, and is also referred to as a unit.

In the present invention, the hyperparameters are not set to random numbers, but rather, the hyperparameters are set on the basis of a new principle in which useful local optimum solutions (useful solution) are anticipated and learning is performed by a CNN constructed by setting initial values on the basis of the useful solution, thereby narrowing down the hyperparameters to desired useful solutions.

Embodiments of the present invention will be explained below with reference to the attached drawings. The attached drawings show specific implementation examples based on the principles of the present invention, but the drawings are merely for understanding the present invention and are not to be used to limit the interpretation of the present invention.

In the embodiments, explanations are made in sufficient detail for a person having ordinary skill in the art to implement the present invention, but other implementations and configurations are possible, and it should be noted that it is possible to modify the configuration and structure as well as interchange various elements without departing from the scope and spirit of the technical concept of the present invention. Thus, the following description should not be understood as limiting the interpretation of the present invention.

In the drawings for describing the embodiments, the same components are, as a rule, assigned the same reference characters, and redundant explanations thereof are omitted.

Embodiment 1

Configuration Example of Computer for Setting Hyperparameters of CNN

FIG. 1 shows a configuration example of a computer of Embodiment 1.

A computer 100 includes an arithmetic device 101, a memory 102, a storage device 103, a communication interface 104, an output interface 105, and an input interface 106. The aforementioned pieces of hardware are connected to each other through a bus 107.

The arithmetic device 101 is a device that controls the entire computer 100, and is a CPU (central processing unit), for example. The arithmetic device 101 executes programs stored in the memory 102. The arithmetic device 101 executes processes according to the programs, thereby operating as functional units to realize specific functions. In the description below, when a functional unit is described as executing a process, it in fact signifies that the arithmetic device 101 is executing a program to realize the functional unit.

The memory 102 stores programs to be executed by the arithmetic device 101 and information to be used by the programs. Also, the memory 102 includes a work area to be temporarily used by the programs. The memory 102 stores programs that realize a setting unit 110, a learning unit 111, and an image processing unit 112.

Figure 2A:
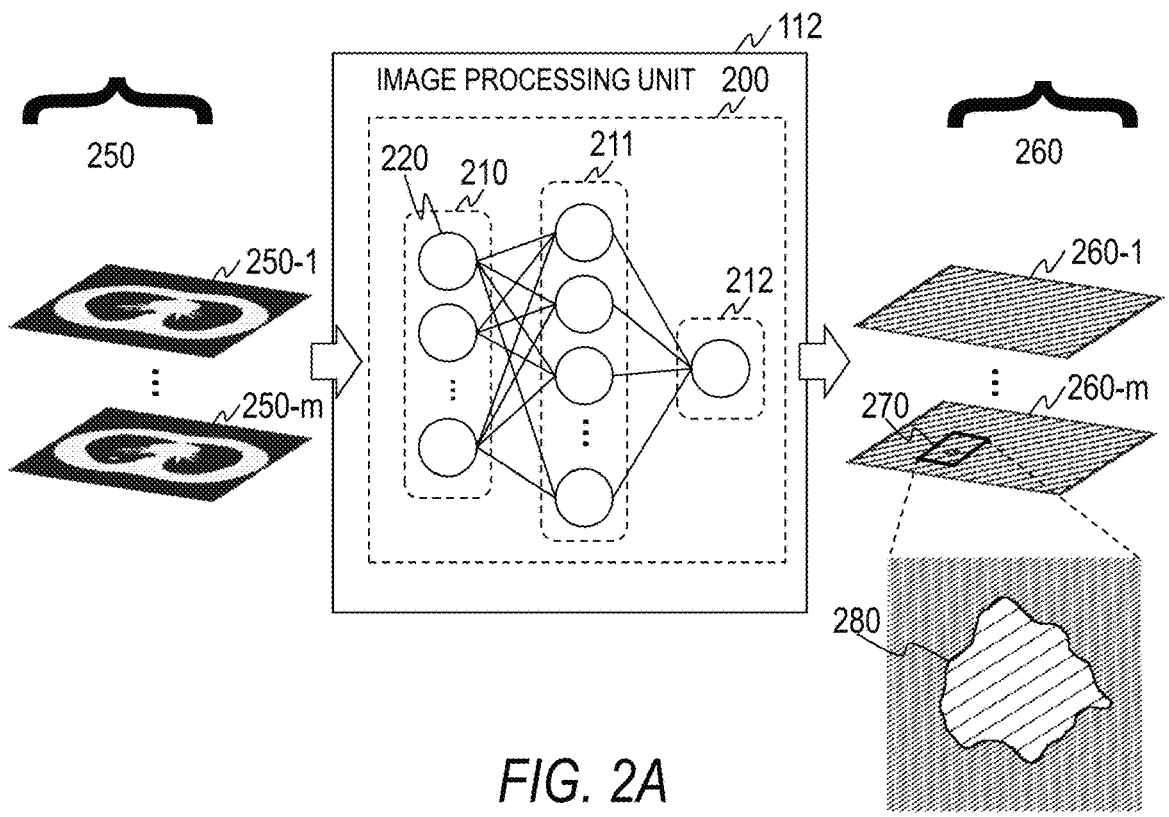
FIGS. 2A and 2B show an example of a structure of a CNN of Embodiment 1.
Figure 2B:
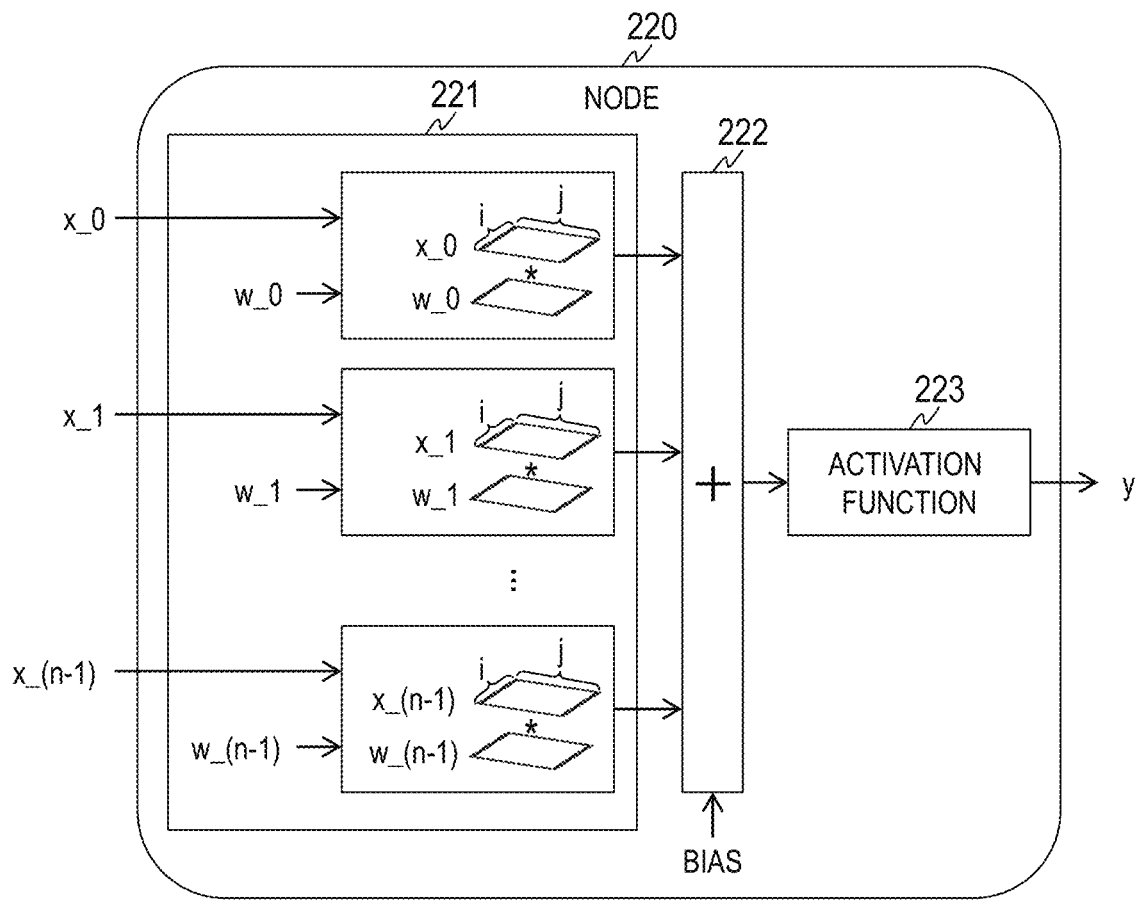

The setting unit 110 constructs a CNN 200 (see FIGS. 2A and 2B). The learning unit 111 executes a learning process for the CNN 200. The learning unit 111 generates learning results as model information 121. The image processing unit 112 uses the model information 121 to perform a certain image processing on an inputted image.

The storage device 103 stores data permanently, and is a hard disk drive (HDD) or a solid-state drive (SSD), for example. The storage device 103 stores learning data management information 120 and the model information 121.

The learning data management information 120 is information for managing learning data in which an input image and output results indicating correctness are associated with each other. The model information 121 is information for managing the structure of the CNN 200. The model information 121 stores hyperparameters, the network structure, other parameters, and the like.

The programs and information stored in the memory 102 may be stored in the storage device 103. In such a case, the arithmetic device 101 reads in the programs and information from the storage device 103, loads the programs and information to the memory 102, and executes the programs loaded to the memory 102.

The communication interface 104 is an interface for communication with an external device such as an image obtaining device through the network 150. The computer 100 transmits and receives various images, information relating to the structure of the CNN 200, commands for controlling the external device, or the like through the communication interface 104.

The network 150 is a local area network (LAN), wide area network (WAN), an intranet, the internet, mobile phone networks, landline networks, and the like. The connection may be wired or wireless. The computer 100 may be directly connected to the external device through the communication interface 104.

The output interface 105 is an interface for connecting to an output device such as a display 160. The display 160 displays various images, information relating to the structure of the CNN 200, the progress of a learning process and image processing, and the like.

The input interface 106 is an interface for connecting to an input device such as a keyboard 170 and a mouse 180. The designer of the CNN 200 (hereinafter referred to as the user) uses the input device to set various values and input various commands.

Structural Example of CNN

FIGS. 2A and 2B show an example of a structure of the CNN 200 of Embodiment 1.

In Embodiment 1, a lung cancer CAD (computer-aided detection/diagnosis) system that employs image processing using the CNN 200 will be described as an example.

This CAD system executes image processing in order to automatically or semi-automatically detect a pathology, identify whether a pathology is normal or abnormal, perform size measurement, distinguish among types of pathologies, or the like. In this system, the CAD analyzes volume data concurrently with a plurality of physicians interpreting the volume data, and presents analysis results to the physicians. As a result, overlooking of pathologies can be prevented.

The image processing unit 112 has inputted thereto, as a plurality of input images 250 (250-1 to 250-$m$), a plurality of slice images constituting chest tomography images (volume data) captured by a CT device or the like. The image processing unit 112 executes image processing for detecting nodules that are pathological sections appearing in the slice images, and outputs, as processing results, a plurality of output images 260 (260-1 to 260-$m$).

In a case where an input image 250 in which a nodule appears is inputted to the image processing unit 112, then an output image 260 including a region of interest (ROI) 280 in a position corresponding to the nodule is outputted. In FIG. 2A, the image processing unit 112 executes image processing on an input image 250-$m$, and as a result, outputs an output image 260-$m$ including the ROI 280 in a rectangular region 270. The rectangular region 270 is added here for ease of understanding, and is not displayed in the actual image.

The output image 260 of Embodiment 1 is outputted as a binarized image. Specifically, the image is set such that the ROI 280 is white (luminance value of 1) and remaining portions are black (luminance value of 0). The output image 260 need not be binarized. For example, the image may be one in which the luminance value is changed in a continuous fashion according to the probability of a given section being a nodule. In this case, one possible display method is one in which if the probability of a given section being a nodule is high, the luminance is set to be high, and if the probability of being a nodule is low, then the luminance is set to be low.

The structure of the CNN 200 that realizes the aforementioned image processing will be explained.

The CNN 200 of Embodiment 1 is constituted of three layers. The first layer is a boundary detection layer 210, the second layer is a movement layer 211, and the third layer is a coupling layer 212. Each of the layers 210, 211, and 212 is constituted of at least one node 220. The structure of the node 220 will be described with reference to FIG. 2B.

The node 220 is constituted a convolution operation 221, an adding operation 222, and an activation function 223.

In the convolution operation 221, a 2-dimensional convolution operation is executed on an input pixel group x_a, which is constituted of n 2-dimensional blocks having i pixels in the horizontal direction by j pixels in the vertical direction. Here, n is an integer and the additional character a is an integer from 0 to n-1. The 2-dimensional convolution operation is performed by preparing n groups of weighting coefficient of the same size as the 2-dimensional block, multiplying each pixel in the block by the corresponding coefficient, and calculating the sum of the resulting values.

In the adding operation 222, a bias is added to the result of the convolution operation 221.

The activation function 223 calculates an output y of one pixel on the basis of the value inputted from the adding operation 222. A rectified linear unit (ReLU), a clipped ReLU, a leaky ReLU, a sigmoid function, a step function, a hyperbolic tangent (tanh) function, or the like is used as the activation function 223, for example.

By executing the aforementioned 2-dimensional block process on all pixels in the inputted image, a 2-dimensional image can be obtained.

A process by which the horizontal and vertical edges are padded such that the size of the outputted image matches that of the inputted image may be performed.

A CNN 200 that detects people, animals, automobiles, two-wheeled vehicles, abandoned items, dangerous items, and the like can be realized by a similar structure. The inputted image may be a still image or a video.

Next, the structure of the boundary detection layer 210, the movement layer 211, and the coupling layer 212 included in the CNN 200 will be described.

Structural Example of Boundary Detection Layer

Figure 3:
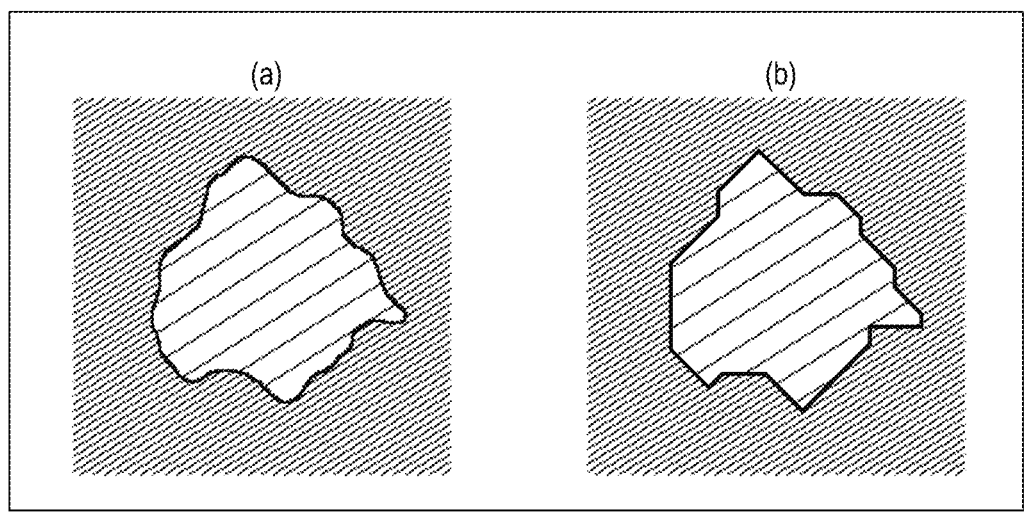
FIG. 3 shows an example of a nodule included in an input image and a ROI included in an output image of Embodiment 1.
Figure 4:
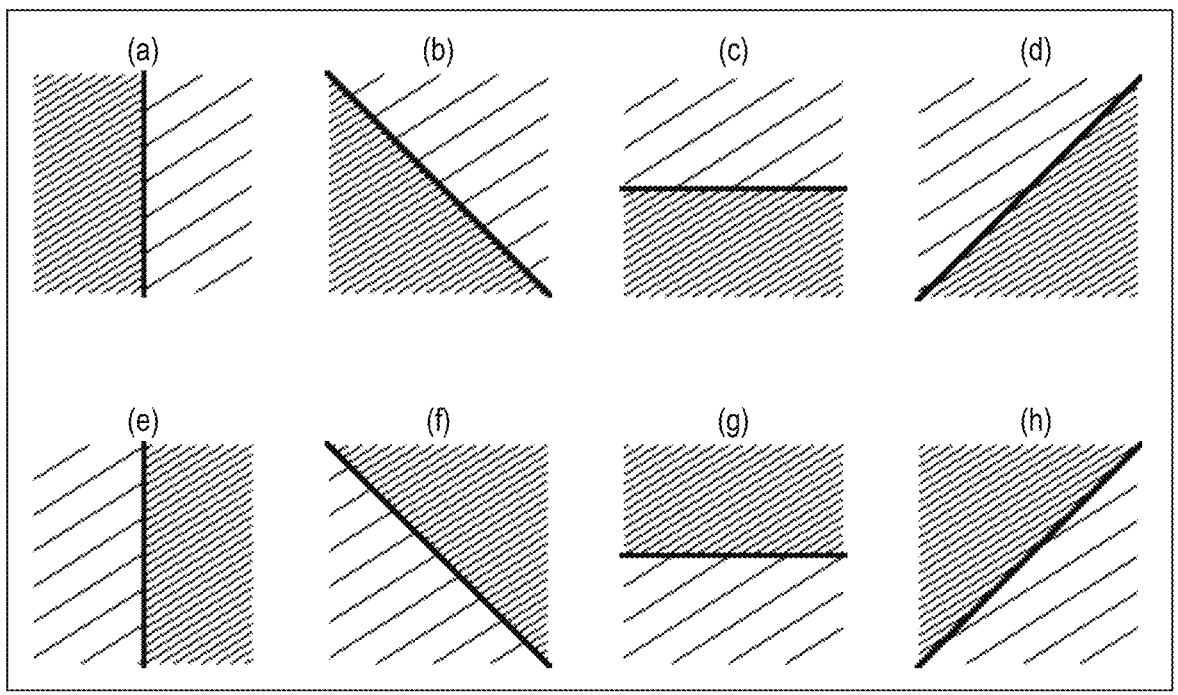
FIG. 4 shows examples of line segments for detecting contours of nodules included in the input image of Embodiment 1.

The boundary detection layer 210 detects a boundary corresponding to the contour of an object. FIG. 3 shows an example of a nodule included in the input image 250 and the ROI 280 included in the output image 260 of Embodiment 1. FIG. 4 shows examples of line segments for detecting contours of nodules included in the input image 250 of Embodiment 1.

In a case where the nodule shown in FIG. 3($a$) is included in the input image 250, then the output image 260 including the ROI 280 shown in FIG. 3($b$) is outputted. The nodule included in the input image 250 is typically represented by continuous luminance values, but for ease of description, a binary image is shown.

In a case of detecting a nodule using eight types of line segments that are respectively rotated at 45 degree intervals such as shown in FIG. 4, the contour of the nodule shown in (a) in FIG. 3 is detected as a combination of line segments such as shown in (b) in FIG. 3. In (a) in FIG. 4, a line segment for a case in which a nodule is present on the right side of the contour is represented. In (b), (c), (d), (e), (f), (g), and (h) in FIG. 4, the line segment in (a) in FIG. 4 is rotated 45 degrees counterclockwise, respectively. In the description below, line segments corresponding to the contour of an object (nodule) are also referred to as boundary line segments.

As can be understood by the description above, the boundary detection layer 210 detects the boundary of an object included in the input image 250 as a combination of given types of boundary line segments. That is, the boundary detection layer 210 is constituted of the same number of nodes 220 as the types of boundary line segments.

Structural Example of Movement Layer

The movement layer 211 detects an object of a given shape on the basis of the boundary of the object detected by the boundary detection layer 210.

Figure 5:
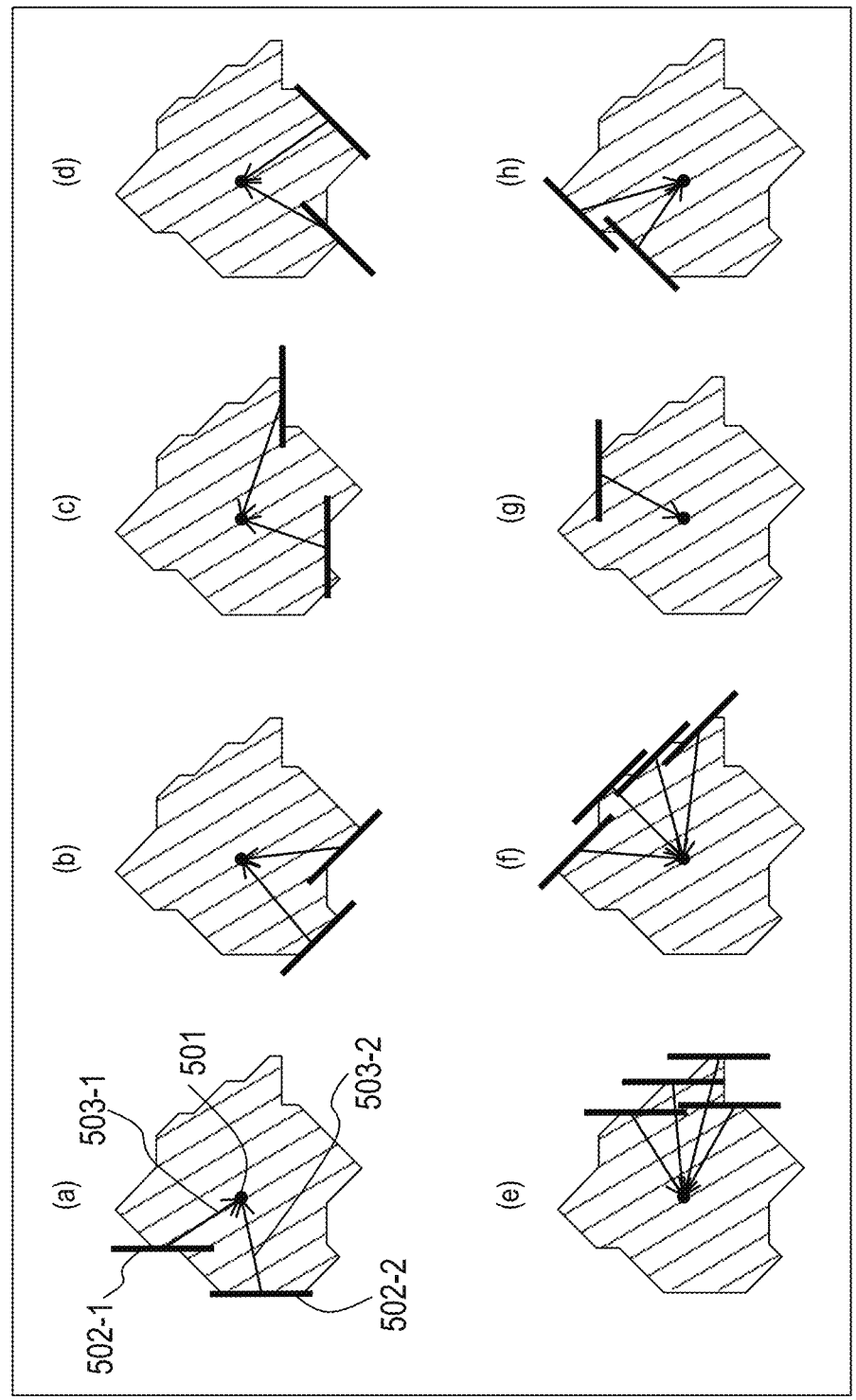
FIG. 5 shows a concept of a process executed in a movement layer of Embodiment 1.

FIG. 5 shows a concept of a process executed in the movement layer 211 of Embodiment 1.

In the nodes 220 of the movement layer 211, a convolution operation is performed in which a reference point 501 is set, a boundary line segment 502 is moved to the reference point 501, and the value of the boundary detection layer 210 corresponding to the boundary line segment 502 is added. The reference point 501 is an arbitrarily set point, and in this case, is a "point in the approximate center of a node".

In (a) in FIG. 5 shows a state in which the boundary line segment 502-1 corresponding to (a) in FIG. 4 is moved to the reference point 501 along a movement direction 503-1, and a boundary line segment 502-2 corresponding to (a) in FIG. 4 is moved to the reference point 501 along a movement direction 503-2. In (b), (c), (d), (e), (f), (g), and (h) of FIG. 5 show similar operations.

In Embodiment 1, the movement direction of the boundary line segments is designated. In a case of setting the movement direction in 45 degree increments, for example, then the movement layer 211 would be constituted of eight nodes 220.

As can be understood by the description above, the movement layer 211 is constituted of the same number of nodes 220 as the number of movement directions of the boundary line segments.

Structural Example of Coupling Layer

The coupling layer 212 calculates the total of the values of boundary line segments moved to the reference point, and outputs detection results of the ROT 280. Specifically, in the node 220 of the coupling layer 212, an operation to calculate the sum of values attained by multiplying the output of the movement layer 211 by coefficients is performed. In other words, the coupling layer 212 is constituted of one node 220 that receives the output of each node of the movement layer 211 and performs a convolution operation on one (1×1) pixel.

<Characteristics of CNN>

The CNN 200 of Embodiment 1 has the following characteristics. In the boundary detection layer 210, a positive value is outputted from the boundary of the nodule, and in portions other than the boundary, zero is outputted. Thus, as a result of moving the boundary line segment 502 to the reference point 501 and adding the value of the boundary, a very large positive value is outputted at the reference point 501, and zero or a small value is outputted at points other than the reference point 501.

Therefore, in a case where the boundary detection layer 210 detects M types of boundary line segments and the movement layer 211 executes a convolution operation for moving the boundary line segments in N directions, the CNN 200 can detect nodules of a fixed shape by the combination of M×N boundaries. That is, the CNN 200 functions as a detector that detects objects of a given shape.

<Learning Process>

Next, the learning process for constructing the CNN 200 of Embodiment 1 will be described.

Figure 6:
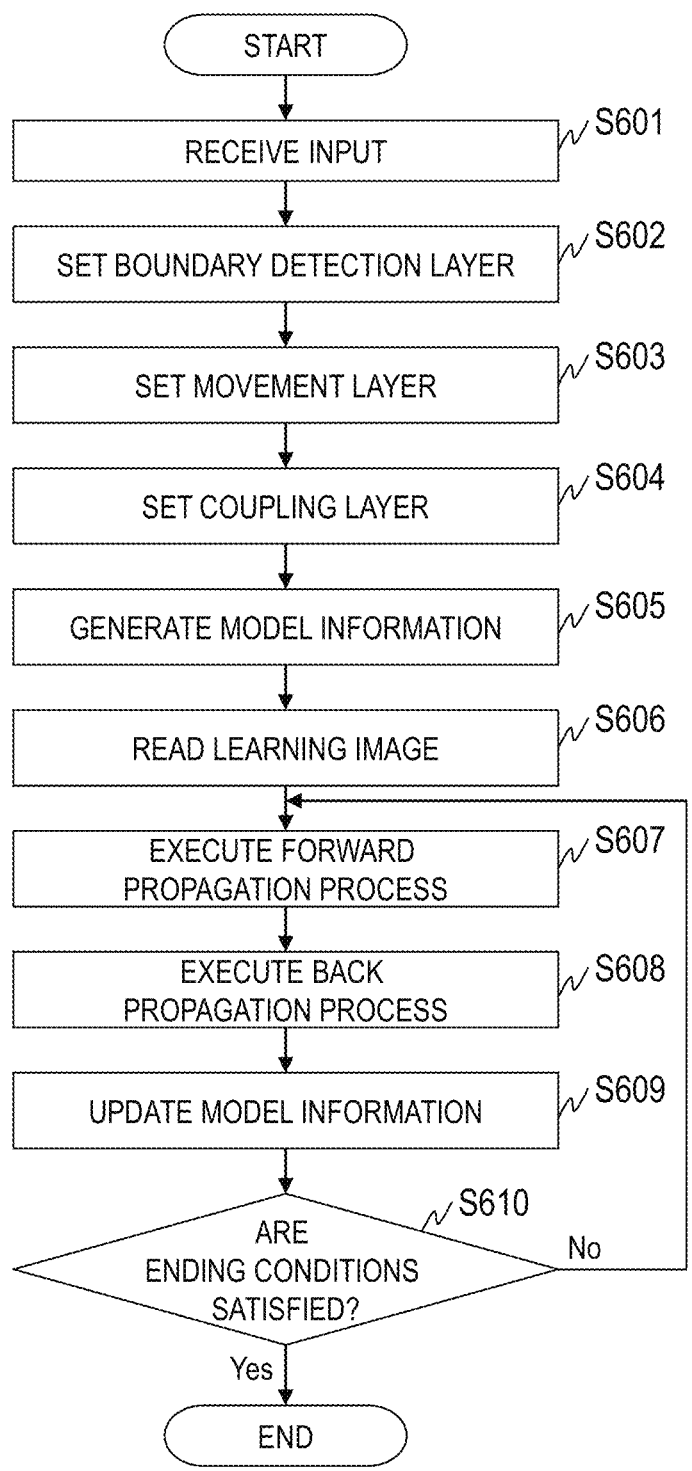
FIG. 6 is a flowchart describing the process executed by the computer of Embodiment 1.
Figure 7:
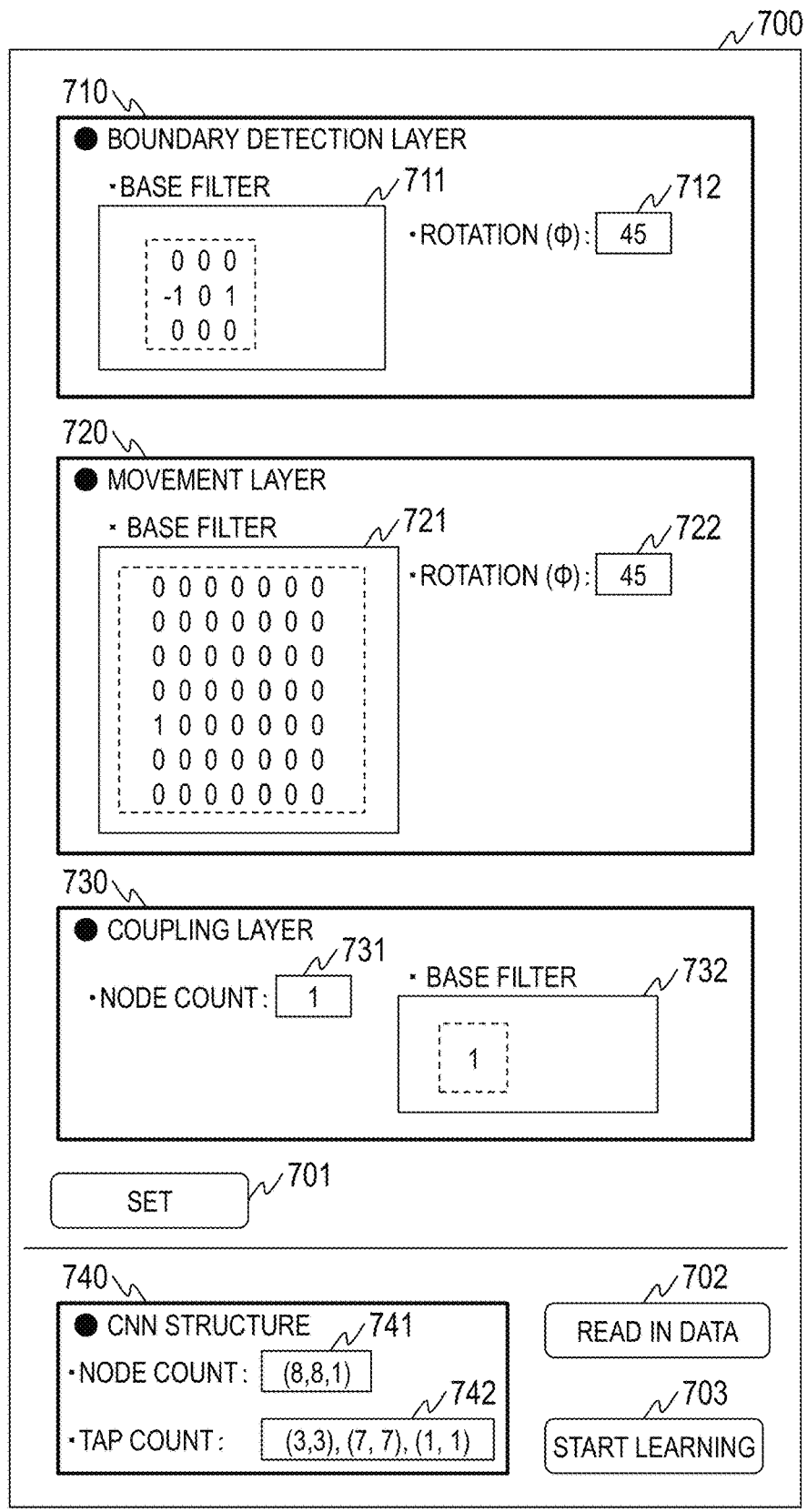
FIG. 7 shows an example of a settings screen displayed by the computer of Embodiment 1.
Figure 11:
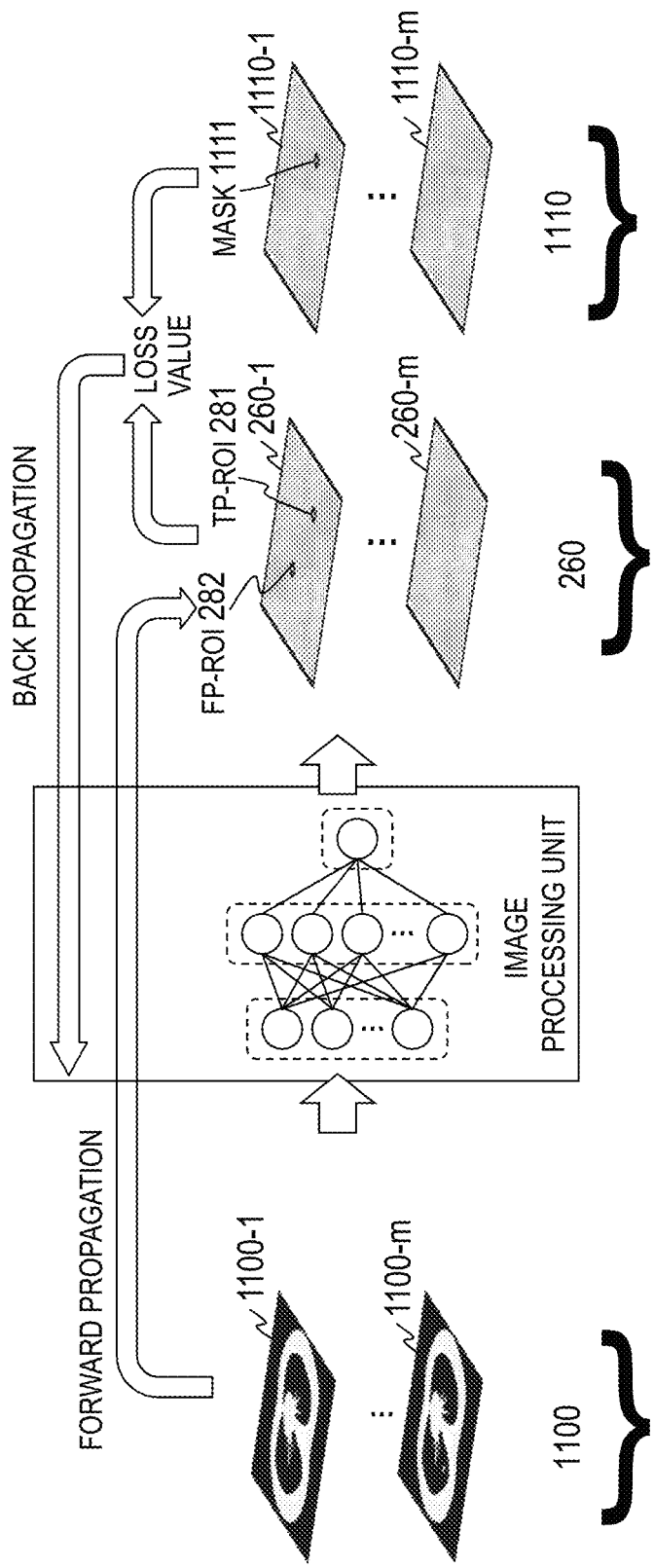
FIG. 11 shows a flow of learning process of Embodiment 1.
Figure 12:
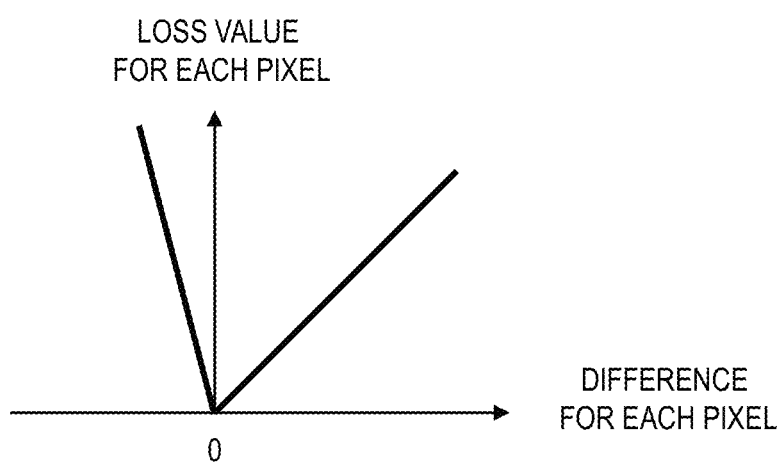
FIG. 12 shows an example of a loss value of Embodiment 1.

FIG. 6 is a flowchart describing the process executed by the computer 100 of Embodiment 1. FIG. 7 shows an example of a settings screen displayed by the computer 100 of Embodiment 1. FIG. 8 shows setting examples for hyperparameters of the boundary detection layer 210 of Embodiment 1. FIGS. 9 and 10 show setting examples for hyperparameters of the movement layer 211 of Embodiment 1. FIG. 11 shows a flow of the learning process of Embodiment 1. FIG. 12 shows an example of a loss value of Embodiment 1.

In a case where the computer 100 receives an operation from the user for executing learning for the CNN 200, the computer calls the setting unit 110. The setting unit 110 displays a settings screen 700 shown in FIG. 7 to the user, and receives input of information (step S601). Here, the settings screen 700 will be described.

The settings screen 700 is a screen displayed by the setting unit 110 in the display 160, and includes a boundary detection layer setting section 710, a movement layer setting section 720, a coupling layer setting section 730, a CNN structure display section 740, a setting button 701, a data read-in button 702, and a learning start button 703.

The boundary detection layer setting section 710 is a section for setting information necessary for generating hyperparameters of the boundary detection layer 210. The boundary detection layer setting section 710 includes a base filter setting section 711 and a rotational angle setting section 712.

The base filter setting section 711 is a section for setting data for calculating weighting coefficients for detecting the boundary line segments as shown in FIG. 4. In FIG. 7, a weighting coefficient that has three pixels in the horizontal direction by three pixels in the vertical direction is shown as an example. The weighting coefficient set in the base filter setting section 711 of FIG. 7 undergoes convolution to the image of (a) in FIG. 4, and thus, a positive value is outputted only on the boundary line segment and zero is outputted outside of the boundary line segment.

Thus, the weighting coefficient of the boundary detection layer 210 functions as a type of filter, and therefore, in the description below, the weighting coefficient set in the base filter setting section 711 is referred to as a boundary detection base filter.

The rotational angle setting section 712 is a section for setting the interval for the angle at which the boundary detection base filter is to be rotated in order to calculate weighting coefficients for detecting a plurality of types of boundary line segments.

In a case where the user sets the interval to $\Delta\theta$ ($\Delta\theta$ being a divisor of 360), the boundary detection layer 210 is configured to detect $360/\Delta\theta$ types of boundary line segments. In other words, the interval is a value for defining the number of types of boundary line segments, and the boundary detection layer 210 has set thereto 360/Δθ nodes 220. Also, by executing 360/Δθ times an operation for rotating by Δθ the boundary detection base filter set by the user, the weighting coefficient of the convolution operation 221 included in each node 220 is calculated.

By using the setting values of FIG. 7 to interpolate by nearest neighbor interpolation and calculate the weighting coefficients on a pixel grid (integer pixel positions) from the weighting coefficients of decimal pixel positions after rotation, the weighting coefficients of (b), (c), (d), (e), (f), (g), and (h) of FIG. 8 are calculated. At this time, each of the weighting coefficients of (a) to (h) of FIG. 8 can detect the boundary line segments of (a) to (h) of FIG. 4. The weighting coefficients on a pixel grid (integer pixel positions) may be interpolated and calculated from the weighting coefficients of decimal pixel positions after rotation by an interpolation method such as bilinear interpolation, bicubic interpolation, or the like instead of nearest neighbor interpolation. Also, if the interval is set at 60 or 90 degrees, the number of nodes 220 is reduced from eight, and if the interval is set to 30 degrees, the number of nodes 220 increases from eight.

Thus, the number of nodes 220 corresponds to the resolution of the boundary, and serves as an indicator for adjusting the performance of the image processing unit 112. In Embodiment 1, by inputting a value based on the geometric characteristics of the boundary relating to the performance of the CNN 200, hyperparameters of some layers included in the CNN 200 are automatically calculated.

The tap counts in the horizontal and vertical directions of the weighting coefficients shown in (a) to (h) of FIG. 8 are three pixels in the horizontal direction by three pixels in the vertical direction, but the tap counts are not limited thereto.

The initial value of the bias value is set to 0. However, a section for setting the bias may be provided in the boundary detection layer setting section 710.

The movement layer setting section 720 is a section for setting information necessary for generating hyperparameters of the movement layer 211. The movement layer setting section 720 includes a base filter setting section 721 and a rotational angle setting section 722.

The base filter setting section 721 is a section for setting data for calculating weighting coefficients for moving the boundary line segments to the reference point as shown in (a) to (h) of FIG. 5. In FIG. 7, a weighting coefficient that has seven pixels in the horizontal direction by seven pixels in the vertical direction is shown as an example. The weighting coefficient corresponds to an operation of moving the boundary line segment by an amount equivalent to the size of the value in a direction in which a value other than zero is set, with the center of the weighting coefficient as the origin of movement. The weighting coefficient of FIG. 7, for example, corresponds to an operation of moving the image of the boundary line segment by one distance unit in the direction of three pixels to the right and one pixel up.

Thus, the weighting coefficient of the movement layer 211 functions as a type of filter, and therefore, in the description below, the weighting coefficient set in the base filter setting section 721 is referred to as a movement base filter.

The rotational angle setting section 722 is a section for setting the interval for the angle at which the movement base filter is to be rotated in order to calculate weighting coefficients for realizing movement in a plurality of directions.

In a case where the user sets the interval of the rotational angle to Δθ' (Δθ' being a divisor of 360), the movement layer 211 is configured to move the boundary line segments in 360/Δθ' movement directions. In other words, the interval is a value for defining the number of movement directions, and the movement layer 211 has set thereto 360/Δθ' nodes 220. Also, by executing 360/Δθ' times an operation for rotating by Δθ' the movement base filter set by the user, the weighting coefficient of the convolution operation 221 included in each node 220 is calculated.

According to the setting values of FIG. 7, the weighting coefficients of (b), (c), (d), (e), (f), and (g) of FIG. 9 can be generated by rotating the movement base filter by the interval angle. If the interval is set at 60 or 90 degrees, the number of nodes 220 is reduced from eight, and if the interval is set to 30 degrees, the number of nodes 220 increases from eight.

Thus, the number of nodes 220 serves as an indicator for adjusting the performance of the image processing unit 112. In Embodiment 1, by inputting a value based on the geometric characteristics of the shape of the object relating to the performance of the CNN 200, hyperparameters of some layers included in the CNN 200 are automatically calculated.

The tap counts in the horizontal and vertical directions of the weighting coefficients shown in (a) to (h) of FIG. 9 are seven pixels in the horizontal direction by seven pixels in the vertical direction, but the tap counts are not limited thereto.

The initial value of the bias value is set to 0. However, a section for setting the bias may be provided in the movement layer setting section 720.

Weighting coefficients such as shown in FIG. 10 may be set. The (a) of FIG. 10 corresponds to movement of one distance unit in the direction of two pixels to the right and three pixels down. The (b) of FIG. 10 corresponds to movement in the direction of three pixels to the right and one pixel up, where the distance in the rightward direction is 0.3 and the distance in the upward direction is 0.7. The (c) of FIG. 10 corresponds to no movement. The (d) of FIG. 10 shows a function as a detector that can attain an output in a case where a boundary line segment is present between 1 and −1. By using this weighting coefficient, thick boundary line segments can be eliminated. That is, the detector functions to limit the size of the object. As a result, detection of large and unwanted shadows such as the chest wall (entire structure outside of lungs including the ribs, the diaphragm, and the like) can be prevented.

The coupling layer setting section 730 is a section for setting information necessary for generating hyperparameters of the coupling layer 212. The coupling layer setting section 730 includes a node count setting section 731 and a base filter setting section 732.

The node count setting section 731 is a section for setting the number of nodes 220 in the coupling layer 212. The base filter setting section 732 is a section for setting data for calculating weighting coefficients of the coupling layer 212. In the present embodiment, a value obtained by dividing the value set in the base filter setting section 732 by the number of outputs of the movement layer 211 (number of nodes 220) is calculated as the weighting coefficient.

The initial value of the bias value is set to 0. However, a section for setting the bias may be provided in the coupling layer setting section 730.

The tap count of the convolution operation or the number of nodes 220 in the coupling layer 212 can be set to any value. For example, the number of nodes 220 of the coupling layer 212 may be set as 2. One node 220 outputs an image in which light and dark (luminance value) are not inverted, and another node 220 outputs an image in which light and dark (luminance value) are inverted. In this case, the difference between two images is outputted as the output image 260 from the coupling layer 212. By configuring the coupling layer 212 in this manner, it is possible to detect only a TP-ROI 281 to be mentioned later.

The setting button 701 is an operation button instructing the generation of hyperparameters based on the values set for the boundary detection layer setting section 710, the movement layer setting section 720, and the coupling layer setting section 730.

The CNN structure display section 740 displays information relating to the hyperparameters of the CNN 200. The CNN structure display section 740 includes a node count display section 741 and a tap count display section 742.

The node count display section 741 is a section for displaying the number of nodes 220 included in each layer. FIG. 7 indicates that the number of nodes 220 in the boundary detection layer 210 is eight, the number of nodes 220 in the movement layer 211 is eight, and the number of nodes 220 in the coupling layer 212 is one.

The tap count display section 742 displays the number of weighting coefficients in each layer, or in other words, the combination of tap counts in the horizontal direction and the vertical direction in a 2-dimensional space. FIG. 7 indicates that the weighting coefficient of the boundary detection layer 210 is set to three in the horizontal direction by three in the vertical direction, the weighting coefficient of the movement layer 211 is set to seven in the horizontal direction by seven in the vertical direction, and the weighting coefficient of the coupling layer 212 is set to one in the horizontal direction by one in the vertical direction.

The data read-in button 702 is an operation button for instructing the reading of learning data from the learning data management information 120.

The learning start button 703 is an operation button for instructing the execution of the learning process.

The description of the settings screen 700 is concluded here. Next, the description returns to FIG. 6.

In a case of receiving an operation from the setting button 701, the setting unit 110 sets the boundary detection layer 210 on the basis of the information set in the boundary detection layer setting section 710 (step S602).

Specifically, the setting unit 110 determines the number of nodes 220 by dividing 360 degrees by the value of the rotational angle setting section 712. Here, the number of nodes 220 is set to n. Also, the setting unit 110 executes an operation of rotating by $\Delta\theta$ the boundary detection base filter set in the base filter setting section 711 n-1 times. As a result, n weighting coefficients including the boundary detection base filter are generated. Also, the setting unit 110 sets the bias to 0.

Next, the setting unit 110 sets the movement layer 211 on the basis of the information set in the movement layer setting section 720 (step S603).

Specifically, the setting unit 110 determines the number of nodes 220 by dividing 360 degrees by the value of the rotational angle setting section 722. Here, the number of nodes 220 is set to n'. Also, the setting unit 110 executes an operation of rotating by $\Delta\theta'$ the movement base filter set in the base filter setting section 721 n'-1 times. As a result, n' weighting coefficients including the movement base filter are generated. Also, the setting unit 110 sets the bias to 0.

Next, the setting unit 110 sets the coupling layer 212 on the basis of the information set in the coupling layer setting section 730 (step S604).

Specifically, the setting unit 110 determines the number of nodes 220 on the basis of the node count setting section 731. Additionally, the setting unit 110 calculates a weighting coefficient by dividing the value set in the base filter setting section 732 by the number of outputs of the movement layer 211. Also, the setting unit 110 sets the bias to 0.

Next, the setting unit 110 generates the model information 121 defining the structure of the CNN 200 subject to the learning process on the basis of the processing results of steps S602 to S604 (step S605).

Next, the setting unit 110 calls the learning unit 111 upon receiving the operation of the data read-in button 702. The learning unit 111 reads the learning data from the learning data management information 120 (step S606). The number and types of learning data that is read can be set arbitrarily.

Next, the learning unit 111 executes forward propagation processing upon receiving an operation from the learning start button 703 (step S607). The forward propagation processing is a process by which inputted data is propagated through a network such as a CNN and output results are obtained. Specifically, the process below is executed.

First, the learning data of Embodiment 1 will be described. The learning data is constituted of a combination of a plurality of learning images 1100 (1100-1 to 1100-$m$) and a plurality of correct images 1110 (1110-1 to 1110-$m$). At least one correct image 1110 includes a mask 1111 corresponding to a nodule. The mask 1111 is set on the basis of findings, experience, and the like by a specialist such as a physician.

In FIG. 11, the correct image 1110 is a binary image where the mask 1111 is white (luminance value of 1) and remaining portions are black (luminance value of 0). The mask 1111 may represent the degree of malignancy of a nodule as a percentage, with a continuous change in luminance. For example, one possible display method is one in which the greater the degree of malignancy is, the greater the luminance is, and the lower the degree of malignancy is, the lower the luminance is.

In forward propagation processing, the following processes are executed using the aforementioned learning data.

(Process 1) The learning unit 111 selects one piece of learning data from among the read learning data, and inputs to the image processing unit 112 the learning image 1100 included in the selected learning data.

(Process 2) The image processing unit 112 generates the output image 260 from the learning image 1100 on the basis of the CNN 200 defined on the basis of the model information 121. In a case where a learning image 1100 with a nodule appearing therein is inputted, then it is expected that an output image 260 including the ROI 280 would be generated.

The process 1 and process 2 may be executed a prescribed number of times. The description of the forward propagation process is concluded here.

Next, the learning unit 111 executes back propagation processing (step S608). The back propagation processing refers to a process in which update results of parameters of each layer are propagated from the output side to the input side, thereby updating the parameters of all layers. Specifically, the process below is executed.

The learning unit 111 calculates a loss value that evaluates the degree of error between the output image 260 and the correct image 1110 included in the selected learning data. The learning unit 111 updates parameters such as the weighting coefficients of each layer and the bias from the output side to the input side of the CNN 200 on the basis of the loss value.

Algorithms (optimizers) for updating the parameters in a multidimensional space, in which the number of dimensions is the total number of parameters, include gradient descent, stochastic gradient descent (SGD), momentum SGD, Adam, AdaGrad, AdaDelta, RMSProp, SMORMS3, and the like. In Embodiment 1, the algorithm is not limited to being an optimizer. In a case of using gradient descent, the learning unit 111 calculates the gradient, which indicates the direction in which and the degree to which the error is reduced, and updates the parameters on the basis of the gradient for each round of learning.

FIG. 12 represents the loss value calculated on the basis of the difference. In Embodiment 1, the sum of function values of each pixel is the loss value used in back propagation processing. The horizontal axis represents the value (difference) of each pixel of the image obtained by subtracting the correct image 1110 from the output image 260, and the vertical axis represents the loss value of each pixel. In the function indicated in FIG. 12, the rate of change in the loss value differs depending on whether the difference is positive or negative.

In a case where the differences of the pixels are positive, this indicates that the pixel values of the output image 260 are greater than the pixel values of the correct image 1110, and that there are more ROIs 280 included in the output image 260 than there are masks 1111 included in the correct image 1110, or in other words, this indicates an over detection status (a false positive). In a case where the differences of the pixels are negative, this indicates that the pixel values of the output image 260 are less than the pixel values of the correct image 1110, and that there are fewer ROIs 280 included in the output image 260 than there are masks 1111 included in the correct image 1110, or in other words, this indicates a detection omission state (a false negative).

In the image processing aimed at detecting nodules, it is preferable that the occurrence of false negatives be mitigated. Thus, as shown in FIG. 12, the slope of the line in the region where the differences of the pixels are positive is set to be greater than the slope of the line in the negative region. In other words, the penalty for false negatives is set to be greater than the penalty for false positives. Thus, it is possible to guide learning such that false negatives are mitigated.

The characteristics indicated in FIG. 12 can be realized using the leaky ReLU function shown in formula 1. The coefficient a satisfies formula 2.

Formula 1

$$f(x) = \max(x, -ax) \qquad (1)$$

Formula 2

$$a \ll 1 \qquad (2)$$

The description of the back propagation process is concluded here.

Next, the learning unit 111 updates the model information 121 on the basis of the results of the back propagation process (step S609).

Next, the learning unit 111 determines whether ending conditions are satisfied (step S610).

In a case where, for example, the number of updates to the model information 121 (number of generations) is greater than a prescribed threshold, the learning unit 111 determines that the ending conditions have been satisfied. Also, in a case where the loss value is less than or equal to a prescribed threshold, the learning unit 111 determines that the ending conditions have been satisfied.

The process of steps S607 to step S610 is the learning process. During the learning process, the output image 260 includes a TP-RO 281 (true positive region of interest), which is an ROI 280 appearing in a location that matches the mask 1111, and a FP-ROI 282, which appears in a location that does not match the mask 1111. By repeatedly executing forward propagation processing and back propagation processing, the detection accuracy for the TP-ROI 281 is increased, while the detection frequency for the FP-ROI 282 is decreased.

In a case where the ending conditions are determined not to have been satisfied, then the learning unit 111 returns to step S607 and executes a similar process. In a case where the ending conditions are determined to have been satisfied, then the learning unit 111 ends the process.

A command window included in an operating system (OS) or the like may be displayed instead of the settings screen shown in FIG. 7. In this case, the setting unit 110 obtains information for each layer from command line arguments.

By using the model information 121 learned in the process of FIG. 6, the image processing unit 112 can detect with high accuracy an ROI 280 that matches perfectly or is similar to the size and shape of the learned nodule in a case where a new input image 250 is inputted.

Application Example of Embodiment 1

In FIGS. 1 to 11, a CNN 200 that detects objects (nodules) was described, but the present invention can be applied to cases in which a CNN 200 that performs other types of image processing is constructed. For example, the present invention can be applied to cases in which a CNN 200 is constructed in order to execute image processing for reducing noise included in an image or image processing for converting a low resolution image into a high resolution image.

In the former image processing, a CNN 200 that includes a layer for detecting noise as objects would be constructed. In the latter image processing, a CNN 200 that includes a layer for detecting contours as objects would be constructed.

The method for determining hyperparameters in such layers is similar to that of the boundary detection layer 210, the movement layer 211, and the like. In other words, the base filter and the rotational angle interval would be set in this method.

Summary of Embodiment 1

In a case of constructing a CNN including layers for extracting ROIs 280 of Embodiment 1, the hyperparameters of the layers can be automatically calculated by inputting information based on the detection accuracy, the characteristics of the ROIs 280, and the like. Thus, even users who lack experience and knowledge can easily construct CNNs.

Embodiment 2

Embodiment 2 differs from Embodiment 1 in that the CNN 200 detects a 3-dimensional ROI from a 3-dimensional image. Below, the description of Embodiment 2 will be focused on differences from Embodiment 1.

The configuration of a computer 100 of Embodiment 2 is the same as the configuration of the computer 100 of Embodiment 1. In Embodiment 2, the structure of the CNN 200 differs.

Structural Example of CNN

Figure 13A:
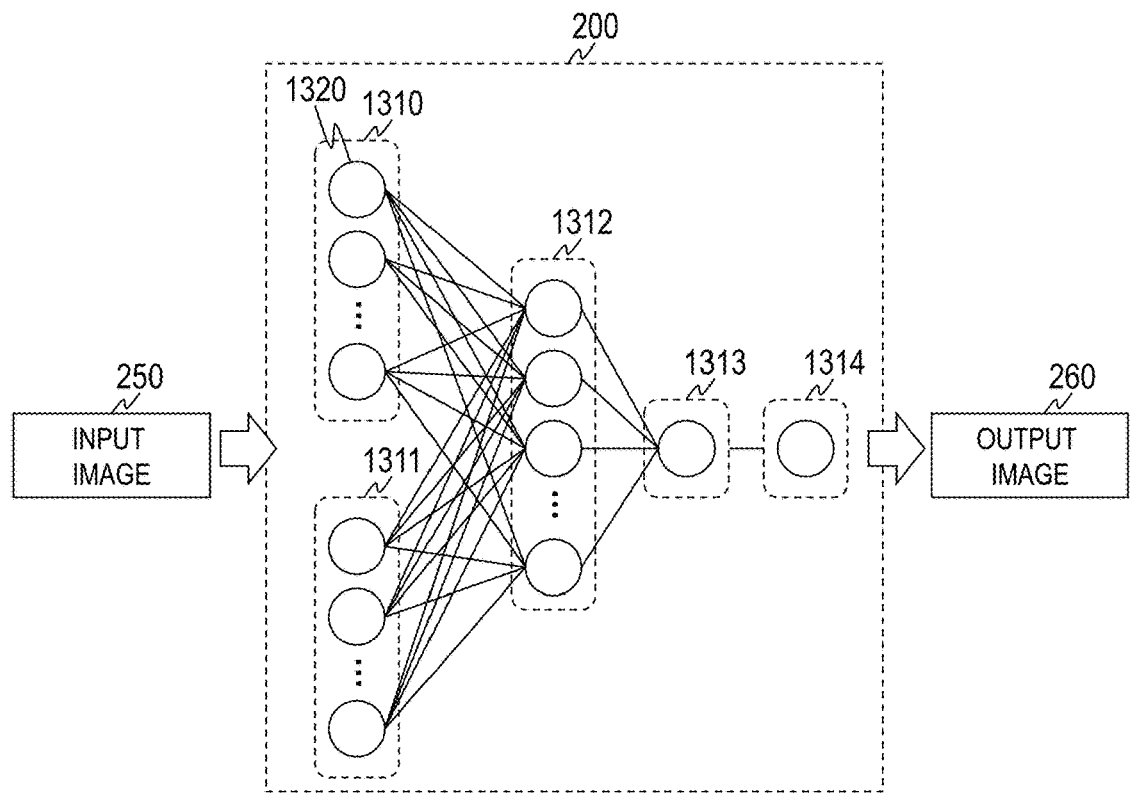
FIGS. 13A and 13B show an example of a structure of a CNN of Embodiment 2.
Figure 13B:
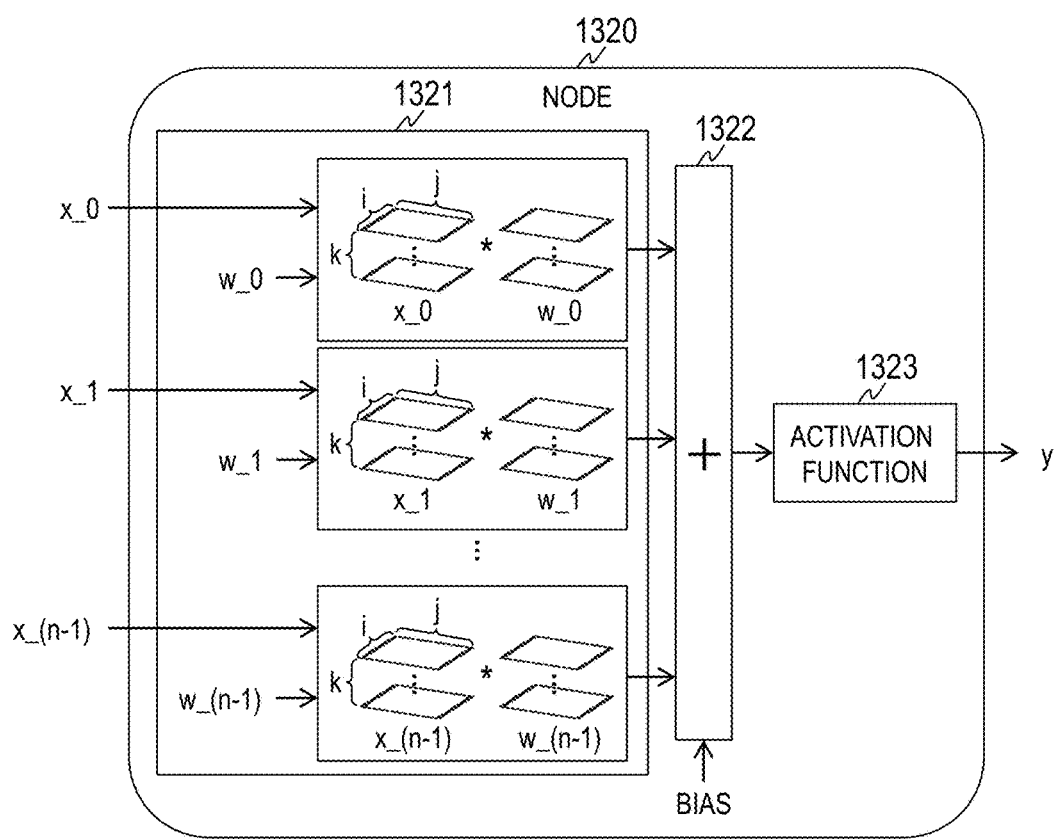

FIGS. 13A and 13B show an example of a structure of the CNN 200 of Embodiment 2.

The CNN 200 of Embodiment 2 is constituted of four layers. The first layer is a boundary detection layer, the second layer is a movement layer 1312, the third layer is a coupling layer 1313, and the fourth layer is a false positive reduction layer 1314. The boundary detection layer of Embodiment 2 is constituted of a first boundary detection layer 1310 and a second boundary detection layer 1311.

Each of the layers 1310, 1311, 1312, 1313, and 1314 includes at least one node 1320. The structure of the node 1320 will be described with reference to FIG. 13B.

The node 1320 is constituted a convolution operation 1321, an adding operation 1322, and an activation function 1323.

In the convolution operation 1321, a 3-dimensional convolution operation is executed on an input pixel group $x\_a$, which is constituted of n 3-dimensional blocks constituted of k slice images, each of which has i pixels in the horizontal direction by j pixels in the vertical direction. Here, n is an integer and the additional character a is an integer from 0 to n-1. The 3-dimensional convolution operation is performed by preparing n groups of weighting coefficient of the same size as the 3-dimensional block, multiplying each pixel in the block by the corresponding coefficient, and calculating the sum of the resulting values.

In the adding operation 1322, a bias is added to the result of the convolution operation 1321.

The activation function 1323 calculates an output y of one pixel on the basis of the value inputted from the adding operation 1322. A rectified linear unit (ReLU), a clipped ReLU, a leaky ReLU, a sigmoid function, a step function, a hyperbolic tangent (tanh) function, or the like is used as the activation function 1323, for example.

By executing the aforementioned 3-dimensional block process on all pixels in the input image 250, a 3-dimensional image can be obtained.

A process by which the horizontal, vertical, and slice direction edges are padded such that the size of the output image matches that of the input image 250 may be performed.

Next, the structure of the boundary detection layer (first boundary detection layer 1310 and second boundary detection layer 1311), the movement layer 1312, the coupling layer 1313, and the false positive reduction layer 1314 included in the CNN 200 will be described.

<Structure of Boundary Detection Layer (First Boundary Detection Layer and Second Boundary Detection Layer)>

The first boundary detection layer 1310 detects a boundary corresponding to the contour of a true object. The second boundary detection layer 1311 detects a boundary corresponding to the contour of an object that is noise.

In a case of detecting nodules from chest tomography images, the images show nodules, the chest wall, the bronchi, the esophagus, blood vessels, and the like. Among these, it is known that shadows of cross-sections of blood vessels are similar to shadows of nodules, and are often falsely detected as nodules. As a measure for dealing with this problem, the CNN 200 of Embodiment 2 includes the second boundary detection layer 1311 for detecting the contour of blood vessels which are often falsely detected as nodules.

First, the first boundary detection layer 1310 will be described. FIG. 14 shows an example of a model of a nodule detected by the CNN 200 of Embodiment 2. FIG. 15 shows an example of weighting coefficients set in order to detect the boundary surfaces of a nodule in Embodiment 2.

In a case where a nodule is included in the input image 250, an output image 260 including the ROI 1400 of a 3-dimensional body (26-plane body) shown in FIG. 14 is outputted. The ROI 1400 is a 3-dimensional body that has rotational symmetry about the Z axis for an amount of rotation that is an integer factor of 45 degrees. In the output image 260, pixels (voxels) in the ROI 1400 have a high luminance (are bright) and pixels outside the ROI have a low luminance (are dark).

As an example of a method for detecting a boundary surface 1401 of the ROI 1400 having diagonal lines, a method for detecting the boundary of the ROI 1400 will be described.

The change in luminance in the x direction and the y direction of a boundary surface 1401 is small, and thus, there are many low frequency components, whereas the change in luminance in the z direction (slice direction) of the boundary surface 1401 is high, and thus, there are many high frequency components. According to the aforementioned characteristics, it is possible to detect the boundary surface 1401 by using a 3-dimensional filter in which an x direction low-pass filter, a y direction low-pass filter, and z direction high-pass filter are multiplied (convolution operation is executed).

One possible example is one in which the x direction and y direction low-pass filters use a 3-tap filter having the weighting coefficient of formula 3, and the z direction high-pass filter uses a 3-tap filter having the weighting coefficient of formula 4. The tap count and the weighting coefficient can be set arbitrarily.

Formula 3

$$\frac{1}{4} \times \{1, 2, 1\} \tag{3}$$

Formula 4

$$\frac{1}{2} \times \{-1, 0, 1\} \tag{4}$$

In this case, the weighting coefficients shown in FIG. 15 are calculated. Each weighting coefficient is multiplied by $\frac{1}{32}$, but this step is omitted.

In a case where a weighting coefficient for detecting one boundary surface is settled, it is possible to determine a weighting coefficient for detecting a boundary surface in each direction according to a similar principle to that of Embodiment 1.

As can be understood by the description above, the first boundary detection layer 1310 detects the boundary of an object included in the input image 250 as a combination of given types of boundary surfaces. That is, the first boundary detection layer 1310 is constituted of the same number of nodes 1320 as the types of boundary surfaces.

Next, the second boundary detection layer 1311 will be described. FIG. 16 shows an example of a model of a blood vessel detected by the CNN 200 of Embodiment 2. FIG. 17 shows an example of weighting coefficients set in order to detect the boundary surfaces of a blood vessel in Embodiment 2.

In a case where a blood vessel is included in the input image 250, an output image 260 including a cylinder 1600 shown in FIG. 16 is outputted. In the output image 260, pixels (voxels) in the cylinder 1600 have a high luminance (are bright) and pixels outside the cylinder have a low luminance (are dark).

The cross-section of the cylinder 1600 parallel to the xy plane is a circle, and the change in luminance between the inside of the circle and the outside of the circle is great, and thus, the xy plane of the cylinder 1600 has a lot of high frequency components. The cylinder 1600 spreads uniformly in the z direction and thus, the z axis direction of the cylinder 1600 has many low frequency components. According to the aforementioned characteristics, it is possible to detect the boundary surface of the cylinder 1600 by using a 3-dimensional filter multiplied by a 2-dimensional filter (2-dimensional high-pass filter) and the z direction low-pass filter (convolution operation is executed). The 2-dimensional filter generated by subtracting an all-pass filter from the product of the x direction low-pass filter and the y direction low-pass filter.

The xy plane all-pass filter is a filter in which the central value is 1 and the value of other positions is 0. The x direction, y direction, and z direction low-pass filters are 3-tap filters having the weighting coefficient of formula 3, for example. The tap count and the weighting coefficient can be set arbitrarily.

In this case, the weighting coefficients shown in FIG. 17 are calculated. Each weighting coefficient is multiplied by ¹⁄₆₄, but this step is omitted.

In a case where a weighting coefficient for detecting one boundary surface is settled, it is possible to determine a weighting coefficient for detecting a boundary surface in each direction according to a similar principle to that of Embodiment 1.

As can be understood by the description above, the second boundary detection layer 1311 detects the boundary of an object included in the input image 250 as a combination of given types of boundary surfaces. That is, the second boundary detection layer 1311 is constituted of the same number of nodes 1320 as the types of boundary surfaces.

The first layer may be configured so as to be able to detect three or more types of boundaries.

Structural Example of Movement Layer

The movement layer 1312 detects an object of a given shape on the basis of the boundary of the objects (nodule and blood vessel) detected by the boundary detection layer 210.

The structure of the movement layer 1312 is one in which the movement layer 211 of Embodiment 1 is expanded in 3 dimensions. Thus, in a case where the movement directions are set at a rotation with 45-degree intervals about the y axis and the z axis, the movement layer 1312 is constituted of 26 nodes 220. The rotational angle about the y axis is greater than 0 degrees and less than or equal to 180 degrees, and the rotational angle about the z axis is 0 degrees to 360 degrees, inclusive.

Structural Example of Coupling Layer

The coupling layer 1313 is one in which the coupling layer 212 of Embodiment 1 is expanded in 3 dimensions.

Structural Example of False Positive Reduction Layer

In a case where the CNN 200 has a three-layer structure including the boundary detection layer, the movement layer 1312, and the coupling layer 1313, in some cases, a false positive shadow (FP-ROI) in the form of isolated points is detected. The false positive reduction layer 1314 eliminates FP-ROIs.

Specifically, the false positive reduction layer 1314 is constituted of nodes 220 including a 3-dimensional low-pass filter that eliminates FP-ROIs.

In a case where characteristics of the low-pass filter being set are unknown, then a 3-dimensional all-pass filter of an appropriate number of taps (5 in the x direction, 5 in the y direction, 5 in the z direction, for example) may be set as the initial value.

<Learning Process>

Next, the learning process for constructing the CNN 200 of Embodiment 2 will be described.

Figure 18:
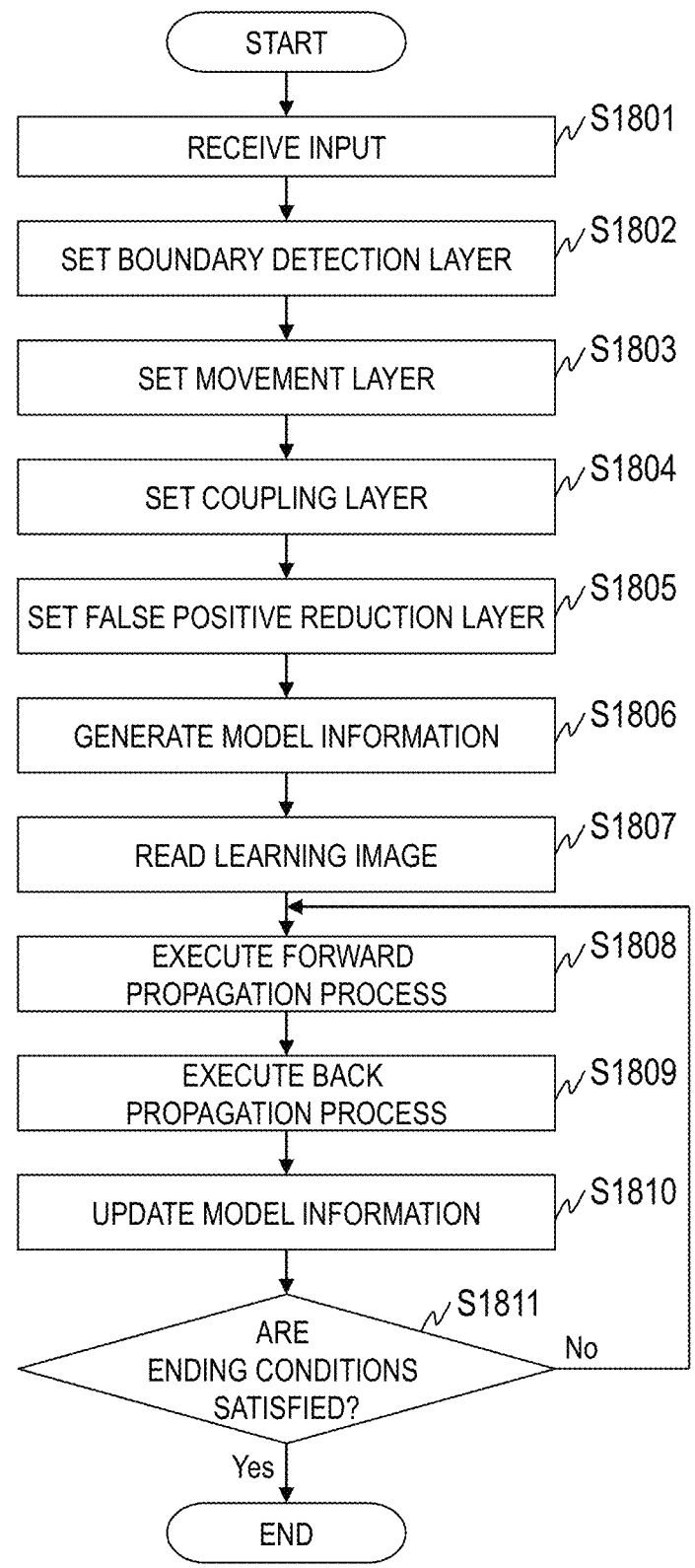
FIG. 18 is a flowchart describing the process executed by the computer of Embodiment 2.
Figure 19:
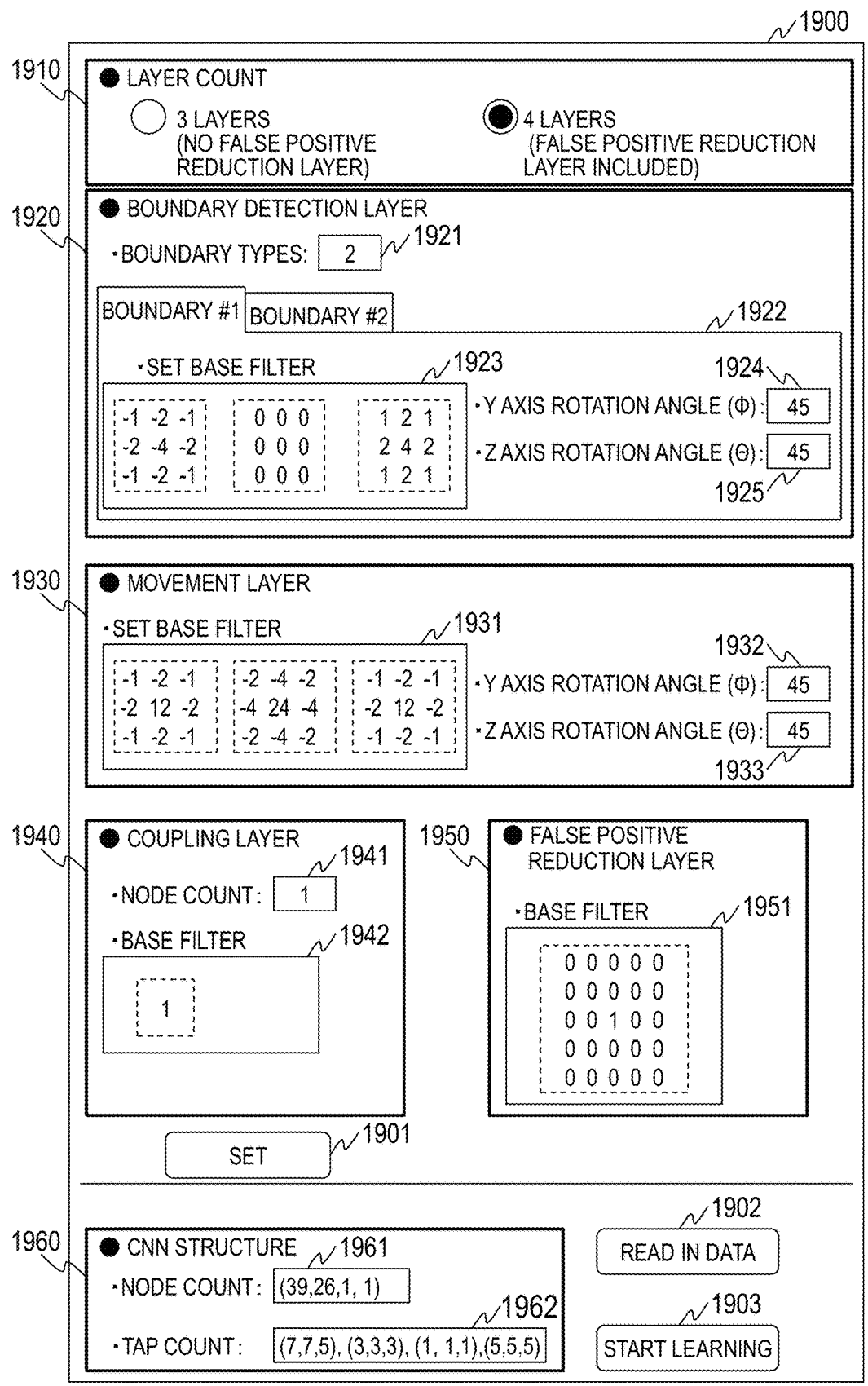
FIG. 19 shows an example of a settings screen displayed by the computer of Embodiment 2.

FIG. 18 is a flowchart describing the process executed by the computer 100 of Embodiment 2. FIG. 19 shows an example of a settings screen displayed by the computer 100 of Embodiment 2.

In a case where the computer 100 receives an operation from the user for executing learning for the CNN 200, the computer calls the setting unit 110. The setting unit 110 displays a settings screen 1900 shown in FIG. 19 to the user, and receives input of information (step S1801). Here, the settings screen 1900 will be described.

The settings screen 1900 is a screen displayed by the setting unit 110 in the display 160, and includes a layer count setting section 1910, a boundary detection layer setting section 1920, a movement layer setting section 1930, a coupling layer setting section 1940, a false positive reduction layer setting section 1950, a CNN structure display section 1960, a setting button 1901, a data read-in button 1902, and a learning start button 1903.

The setting button 1901, the data read-in button 1902, and the learning start button 1903 are, respectively, the same operation buttons as the setting button 701, the data read-in button 702, and the learning start button 703.

The layer count setting section 1910 is a section for setting the number of layers in the CNN 200. The layer count setting section 1910 includes radio buttons for selecting either a three-layer structure CNN 200 that does not include the false positive reduction layer 1314 or a four-layer structure CNN that includes the false positive reduction layer 1314. The setting unit 110 performs control such that the false detection reduction layer setting section 1950 receives input in a case where the four-layer structure CNN 200 is detected.

The boundary detection layer setting section 1920 is a section for setting information necessary for generating hyperparameters of the boundary detection layer. The boundary detection layer setting section 1920 includes a boundary type setting section 1921 and a boundary setting section 1922.

The boundary type setting section 1921 is a section for setting the number (types) of objects for which the boundaries are to be detected.

The boundary setting section 1922 is a section for setting information necessary for generating hyperparameters of the layer for detecting boundaries of each object. The boundary setting section 1922 displays the same number of tabs as the number (types) of objects. The tabs include a base filter setting section 1923, a y axis rotational angle setting section 1924, and a z axis rotational angle setting section 1925.

The base filter setting section 1923 is a section for setting data for calculating weighting coefficients for detecting the boundary surfaces as shown in FIG. 14 or 16.

The y axis rotational angle setting section 1924 is a section for setting the interval for the angle at which the boundary detection base filter is to be rotated about the y axis in order to calculate weighting coefficients for detecting a plurality of types of boundary surfaces. The z axis rotational angle setting section 1925 is a section for setting the interval for the angle at which the boundary detection base filter is to be rotated about the z axis in order to calculate weighting coefficients for detecting a plurality of types of boundary surfaces.

In a case where the user sets the y axis rotational angle to Φ, sets the interval to ΔΦ(ΔΦ being a divisor of 180), sets the z axis rotational angle to θ, and sets the interval to Δθ (Δθ being a divisor of 360), then the first boundary detection layer 1310 has set thereto m nodes 220 calculated according to formula 5. The first term of formula 5 represents the combination of rotational angles, and the second term represents the upper boundary surface (Φ=0, θ=0) and the lower boundary surface (Φ=180, θ=0).

Formula 5

$$m = \left(\frac{180}{\Delta\phi} - 1\right) \times \frac{360}{\Delta\theta} + 2 \tag{5}$$

In a case of detecting the boundary surfaces of the ROI 1400 shown in FIG. 14, for example, Φ is 45 degrees, 90 degrees, or 135 degrees, and θ is 0 degrees, 45 degrees, 90 degrees, 135 degrees, 180 degrees, 225 degrees, 270 degrees, or 315 degrees. In this case, as shown in the first term of formula 5, the number of possible combinations is 24. In a case where the boundary surface 1401 and the lower boundary surface obtained by inverting the z axis coordinate of the boundary surface 1401 are combined with the aforementioned boundary surfaces, then 26 boundary surfaces can be detected. In other words, the interval ΔΦ and the interval Δθ are values that define the types of boundary surfaces.

Also, by performing m 3-dimensional rotations on the boundary detection base filter set by the user, the weighting coefficient is calculated.

Specifically, the setting unit 110 performs a rotation operation in a 3-dimensional space indicated by formula (6) in which the 3-dimensional coordinates (x, y, z) of the weighting coefficient are rotated by Φ about the y axis, and by θ about the z axis. Furthermore, the setting unit 110 moves the boundary detection base filter to 3-dimensional coordinates (x', y', z') after rotation. At this time, the position of the weighting coefficient after rotation is generally a decimal pixel position, and thus, the value on a pixel grid (integer pixel position) is determined by an interpolation method such as near neighbor interpolation, bilinear interpolation, and bicubic interpolation, and the weighting coefficient after rotation is determined.

Formula 6

$$\begin{pmatrix} x' \\ y' \\ z' \end{pmatrix} = \begin{pmatrix} \cos\theta & -\sin\theta & 0 \\ \sin\theta & \cos\theta & 0 \\ 0 & 0 & 1 \end{pmatrix} \begin{pmatrix} \cos\phi & 0 & \sin\phi \\ 0 & 1 & 0 \\ -\sin\phi & 0 & \cos\phi \end{pmatrix} \begin{pmatrix} x \\ y \\ z \end{pmatrix} \tag{6}$$

Also, in a case where the user sets the y axis rotational angle to Φ', sets the interval to ΔΦ' (ΔΦ being a divisor of 180), sets the z axis rotational angle to θ', and sets the interval to Δθ' (Δθ' being a divisor of 180), then the second boundary detection layer 1311 has set thereto m' nodes 220 calculated according to formula 7.

Formula 7

$$m' = \left(\frac{180}{\Delta\phi'} - 1\right) \times \frac{180}{\Delta\theta'} + 1 \tag{7}$$

In a case of detecting the boundary surfaces of the cylinder 1600, it is necessary to distinguish between the upper boundary surface and the lower boundary surface. Thus, the second term of formula 7 is 1.

Also, by performing m' 3-dimensional rotations on the boundary detection base filter set by the user, the weighting coefficient is calculated. The calculation method for weighting coefficients is similar to the calculation method for weighting coefficients of the first boundary detection layer 1310.

Thus, the number of nodes 220 corresponds to the resolution of the boundary, and serves as an indicator for adjusting the performance of the image processing unit 112. In Embodiment 2, by inputting a value based on the geometric characteristics of the boundary relating to the performance of the CNN 200, hyperparameters of some layers included in the CNN 200 are automatically calculated.

The initial value of the bias value is set to 0. However, a section for setting the bias may be provided in the boundary setting section 1922.

The movement layer setting section 1930 is a section for setting information necessary for generating hyperparameters of the movement layer 1312. The movement layer setting section 1930 includes a base filter setting section 1931, a y axis rotational angle setting section 1932, and a z axis rotational angle setting section 1933.

The base filter setting section 1931 is a section for setting data for use in generating weighting coefficients for moving the boundary surfaces to the reference point.

The y axis rotational angle setting section 1924 is a section for setting the interval for the angle at which the movement base filter is to be rotated about the y axis in order to calculate weighting coefficients for realizing a plurality of types of movements. The z axis rotational angle setting section 1925 is a section for setting the interval for the angle at which the movement base filter is to be rotated about the z axis in order to calculate weighting coefficients for realizing a plurality of types of movements.

In a case where the user sets the y axis rotational angle to c, sets the interval to ΔΦ (ΔΦ being a divisor of 180), sets the z axis rotational angle to θ, and sets the interval to Δθ (Δθ being a divisor of 360), then the number of nodes 220 is calculated according to formula 5. In other words, the interval ΔΦ and the interval Δθ are values that define the types of movement directions.

Also, by performing m 3-dimensional rotations on the movement base filter set by the user, the weighting coefficient is calculated. The calculation method for weighting coefficients is similar to the calculation method for weighting coefficients of the first boundary detection layer 1310.

Thus, the number of nodes 220 serves as an indicator for adjusting the performance of the image processing unit 112. In Embodiment 2, by inputting a value based on the geometric characteristics of the shape of the object relating to the performance of the CNN 200, hyperparameters of some layers included in the CNN 200 are automatically calculated.

The initial value of the bias value is set to 0. However, a section for setting the bias may be provided in the movement layer setting section 1930.

The coupling layer setting section 1940 is a section for setting information necessary for generating hyperparameters of the coupling layer 1313. The coupling layer setting section 1940 includes a node count setting section 1941 and a base filter setting section 1942.

The node count setting section 1941 is a section for setting the number of nodes 220 in the coupling layer 1313. The base filter setting section 1942 is a section for setting data for use in generating weighting coefficients of the coupling layer 1313. In the present embodiment, a value obtained by dividing the value set in the base filter setting section 1942 by the number of outputs of the movement layer 1312 (number of nodes 220) is calculated as the weighting coefficient.

The initial value of the bias value is set to 0. However, a section for setting the bias may be provided in the coupling layer setting section 1940.

The false positive reduction layer setting section 1950 is a section for setting information necessary for generating hyperparameters of the false positive reduction layer 1314. The false positive reduction layer setting section 1950 includes a base filter setting section 1951. The number of nodes 220 in the false positive reduction layer 1314 is one, and thus, no section for setting the number of nodes 220 is included.

The base filter setting section 1951 is a section for setting data for use in generating weighting coefficients of the false positive reduction layer 1314. In the present embodiment, the base filter setting section 1951 has set thereto a weighting coefficient of a given 3-dimensional all-pass filter.

The CNN structure display section 1960 displays information relating to the hyperparameters and the like of the CNN 200. The CNN structure display section 1960 includes a node count display section 1961 and a tap count display section 1962.

The initial value of the bias value is set to 0. However, a section for setting the bias may be provided in the false positive reduction layer setting section 1950.

The description of the settings screen 1900 is concluded here. Next, the description returns to FIG. 18.

In a case of receiving an operation from the setting button 1901, the setting unit 110 sets the first boundary detection layer 1310 and the second boundary detection layer 1311 on the basis of the information set in the boundary detection layer setting section 1920 (step S1802). Specifically, the process below is executed.

In a case of setting the first boundary detection layer 1310, the setting unit 110 determines the number of nodes 220 by plugging into formula 5 the values of the y axis rotational angle setting section 1924 and the z axis rotational angle setting section 1925. Also, the setting unit 110 executes an operation of rotating the base filter set in the base filter setting section 1923 m times. As a result, the weighting coefficient of each node 220 is calculated. The setting unit 110 sets the bias to 0.

In a case of setting the second boundary detection layer 1311, the setting unit 110 determines the number of nodes 220 by plugging into formula 7 the values of the y axis rotational angle setting section 1924 and the z axis rotational angle setting section 1925. Also, the setting unit 110 executes an operation of rotating the base filter set in the base filter setting section 1923 m' times. As a result, the weighting coefficient of each node 220 is calculated. The setting unit 110 sets the bias to 0. The description of the process of step S1802 is concluded here.

Next, the setting unit 110 sets the movement layer 1312 on the basis of the information set in the movement layer setting section 1930 (step S1803).

Specifically, the setting unit 110 determines the number of nodes 220 by plugging into formula 5 the values of the y axis rotational angle setting section 1932 and the z axis rotational angle setting section 1933. Also, the setting unit 110 executes an operation of rotating the base filter set in the base filter setting section 1931 m times. As a result, the weighting coefficient of each node 220 is calculated. The setting unit 110 sets the bias to 0.

Next, the setting unit 110 sets the coupling layer 1313 on the basis of the information set in the coupling layer setting section 1940 (step S1804).

Specifically, the setting unit 110 determines the number of nodes 220 on the basis of the node count setting section 1941. Additionally, the setting unit 110 calculates a weighting coefficient by dividing the value set in the base filter setting section 1931 by the number of outputs of the movement layer 1312. The setting unit 110 sets the bias to 0.

Next, the setting unit 110 sets the false positive reduction layer 1314 on the basis of the information set in the false positive reduction layer setting section 1950 (step S1805).

Specifically, the setting unit 110 sets the weighting coefficient set in the base filter setting section 1951. If the three-layer structure CNN 200 is selected in the layer count setting section 1910, the setting unit 110 proceeds to step S1806 without executing the process of step S1805.

Next, the setting unit 110 generates the model information 121 defining the structure of the CNN 200 subject to the learning process on the basis of the processing results of steps S1802 to S1805 (step S1806).

Next, the setting unit 110 calls the learning unit 111 upon receiving the operation of the data read-in button 1902. The learning unit 111 reads the learning data from the learning data management information 120 (step S1807).

Next, upon receiving an operation of the learning start button 1903, the learning unit 111 executes forward propagation processing and back propagation processing (steps S1808, S1809), and updates the model information 121 on the basis of the update results (step S1810).

The forward propagation processing, the back propagation processing, and the update process for the model information 121 are similar processes to Embodiment 1, and thus, detailed descriptions thereof are omitted.

In Embodiment 2, 2-dimensional slice images in the xy plane that are stacked in the z direction are inputted as the 3-dimensional input image 250. The image processing unit 112 may execute a process such as slice interpolation in which the gap between pixels in a slice image and the gap between pixel among slice images matches, and input the processed input image 250 to the CNN 200.

Next, the learning unit 111 determines whether ending conditions are satisfied (step S1811).

In a case where the ending conditions are determined not to have been satisfied, then the learning unit 111 returns to step S1808 and executes a similar process. In a case where the ending conditions are determined to have been satisfied, then the learning unit 111 ends the process.

By using the model information 121 learned in the process of FIG. 18, the image processing unit 112 can detect with high accuracy an ROI 1400 that is similar to the size and shape of the learned nodule if a new input image 250 is inputted.

Figure 20:
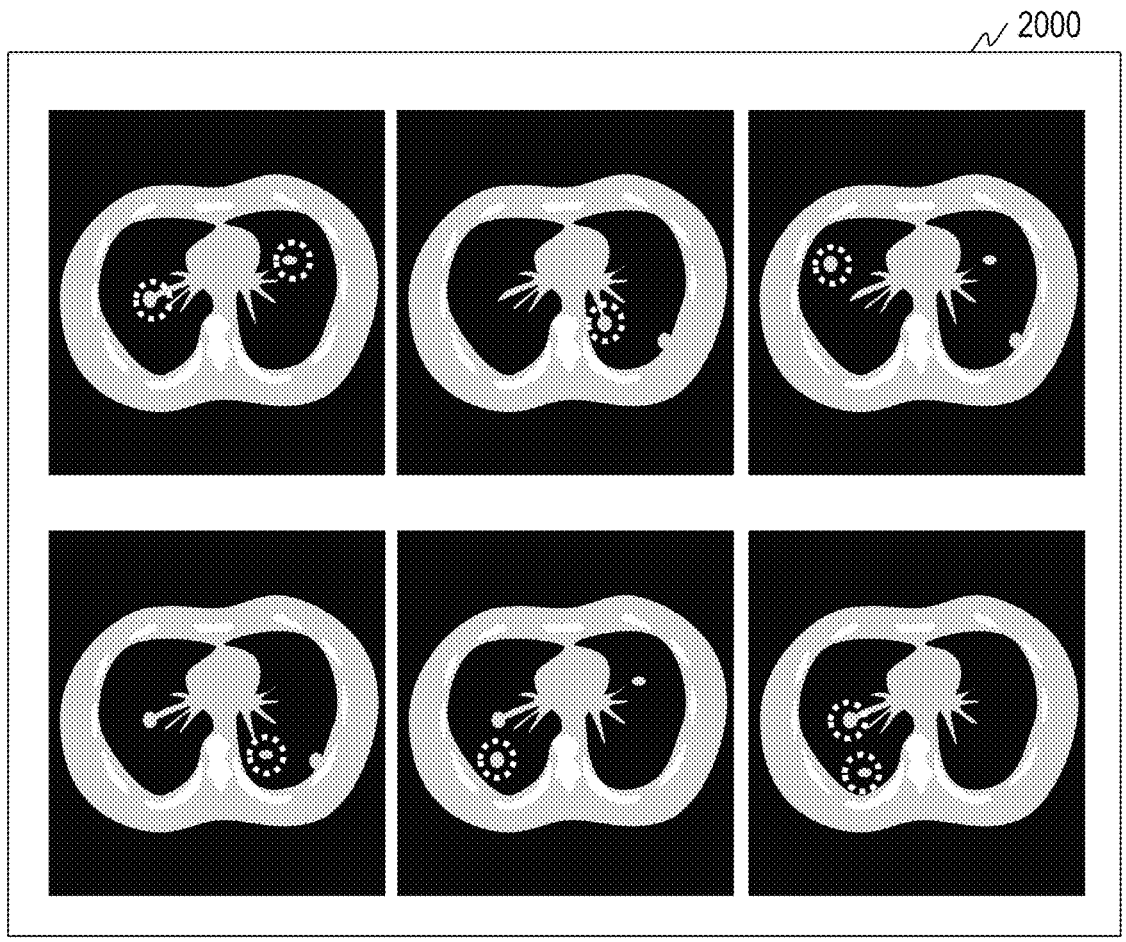
FIG. 20 shows an example of a performance evaluation screen displayed by the computer of Embodiment 2.

After the process of FIG. 18 is completed, the user may confirm the performance of the image processing unit 112 using an evaluation input image 250. FIG. 20 shows an example of a performance evaluation screen displayed by the computer 100 of Embodiment 2.

A performance evaluation screen 2000 is a screen that displays the input images 250 on which the detected ROIs 280 are superimposed, and is displayed in the display 160 by the learning unit 111, for example. In the performance evaluation screen 2000 of FIG. 20, six input images 250 including ROIs 280 that are shown with a white dotted line circle therearound are displayed.

As a method for displaying the ROIs 280, the boundary may be displayed in the manner of FIG. 3 or FIG. 14. A circle or a rectangle that is centered on the barycenter of the ROT 280 and that surrounds the ROT 280 may be displayed.

By referring to the performance evaluation screen 2000, the user can confirm whether or not the image processing unit 112 (CNN 200) has the desired processing performance. If the image processing unit 112 does not having the desired processing performance, the user once again inputs information to the settings screen 1900 and causes the computer 100 to execute the learning process.

(Case 1) If there are many images where blood vessels are being detected as nodules, then there is a possibility that the blood vessels are not being detected well. In this case, the base filter of the second boundary detection layer 1311 may be adjusted.

(Case 2) If images are being displayed in which small nodules are detected but large nodules are not detected, then there is a high probability that the settings of the movement layer 1312 are unsuitable. In this case, the user would set a base filter or the like with an increased tap count compared to the previous round.

(Case 3) If the detection rate for TP-ROIs 281 is low or if the detection rate for FP-ROIs 282 is high, then there is a high probability that there are an inadequate number of nodes 220 in each layer. In this case, the user would set the rotational angle interval to be smaller than in the previous round. In a case where the previous interval is 45 degrees, for example, the user could set the interval to 30 degrees or 22.5 degrees.

(Case 4) If the nodules in the input images 250 used for the learning process are the only nodules detected at high accuracy, or in other words, if overfitting is occurring, then there is a high probability of there being too many nodes 220 in each layer. In this case, the user would set the rotational angle interval to be larger than in the previous round. In a case where the previous interval is 45 degrees, for example, the user could set the interval to 60 degrees or 90 degrees.

In this manner, the user can understand how the value inputted on the basis of geometric characteristics of the boundary and the geometric characteristics of the shape of the object relating to the performance of the CNN 200 contributes to the processing performance of the image processing unit 112. Thus, even beginner designers can easily adjust the CNN 200. Also, experienced individuals can see a reduction in time required to adjust the CNN 200.

Summary of Embodiment 2

In a case of constructing a CNN including layers for extracting ROIs 1400 of Embodiment 2, the hyperparameters of the CNN can be automatically calculated by inputting information based on the detection accuracy, the characteristics of the ROIs 1400, and the like. Thus, CNNs can be constructed with ease. Also, the hyperparameters can be adjusted with ease.

Embodiment 3

In Embodiment 3, a system for constructing the CNN 200 and executing learning as described in Embodiments 1 and 2 will be described. Below, the description of Embodiment 3 will be focused on differences from Embodiment 1.

Configuration Example of System for Setting Hyperparameters of CNN

Figure 21:
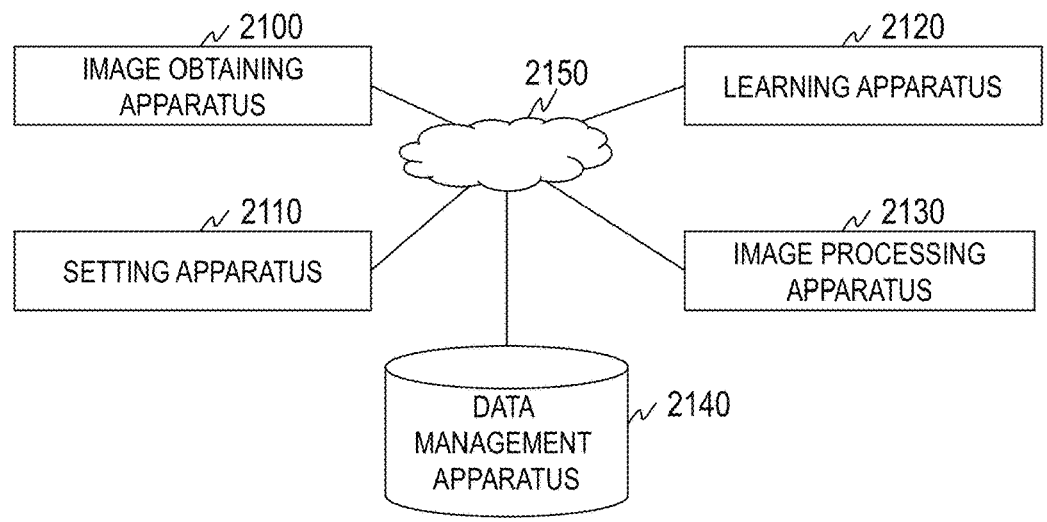
FIG. 21 shows a configuration example of a system of Embodiment 3.

FIG. 21 shows a configuration example of a system of Embodiment 3.

The system is constituted of an image obtaining apparatus 2100, a setting apparatus 2110, a learning apparatus 2120, an image processing apparatus 2130, and a data management apparatus 2140. The apparatuses are all connected to a network 2150.

The image obtaining apparatus 2100 is an apparatus that obtains images. The images obtained by the image obtaining apparatus 2100 are handled as input images 250. Examples of the image obtaining apparatus 2100 include medical apparatus such as a CT apparatus, an X-ray fluoroscopic imaging apparatus, an MRI apparatus, and an ultrasound probe; a surveillance camera; a video camera; a digital camera; a smartphone; and the like.

The setting apparatus 2110 has a function corresponding to the setting unit 110, and constructs the CNN 200 by calculating the hyperparameters of the CNN 200 to undergo the learning process. The learning apparatus 2120 has a function corresponding to the learning unit 111 and executes the learning process for the CNN 200. The image processing apparatus 2130 has a function corresponding to the image processing unit 112 and executes image processing using inputted images.

The setting apparatus 2110, the learning apparatus 2120, and the image processing apparatus 2130 can be realized using general purpose computers.

The data management apparatus 2140 manages input images 250 obtained by the image obtaining apparatus 2100, output images 260 outputted by the image processing apparatus 2130, learning data, model information 121, and the like. The data management apparatus 2140 can be realized using a storage system having a plurality of storage medium, for example. The data management apparatus 2140 can read data, store data, and the like according to instructions inputted from outside.

The setting apparatus 2110, the learning apparatus 2120, and the image processing apparatus 2130 may be provided with a log-in function that enables only specific users to perform operations. In one example, the setting apparatus 2110 and the learning apparatus 2120 would only receive operations from the designer of the CNN 200, and the image processing apparatus 2130 would receive operations from the designer of the CNN 200, physicians, and the like. By providing this log-in function, a cloud service or the like can be realized.

The learning device 2120 and the image processing device 2130 may be consolidated as one device.

The processes executed by the devices are the same processes described in Embodiments 1 and 2, and thus, descriptions thereof are omitted.

Summary of Embodiment 3

The construction method for CNNs described in Embodiments 1 and 2 can be used in various system or service formats.

Overall Summary (i) According to the present invention, by the user inputting information based on the detection accuracy, the characteristics of the ROIs, and the like, hyperparameters of the CNN can be automatically calculated. Thus, CNNs can be constructed with ease. Also, the hyperparameters can be adjusted with ease.

(ii) The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer that constructs a neural network for executing image processing, the neural network being constituted of a plurality of layers, each of which includes at least one node,
   the neural network including a detection layer that realizes a process for detecting an object in an image,
   the computer comprising: an arithmetic device; and a storage device coupled to the arithmetic device,
   the arithmetic device being configured to execute:
   a first process of obtaining setting information for constructing the neural network including a plurality of setting values relating to characteristics of a boundary of the object and a shape of the object, the plurality of setting values being values for calculating a plurality of hyperparameters of the detection layer;
   a second process of constructing the neural network on the basis of the setting information; and
   a third process of generating model information that manages a structure of the constructed neural network,
   wherein the second process including a process of calculating the plurality of hyperparameters of the detection layer on the basis of the plurality of setting values.

2. The computer according to claim 1,
   wherein the neural network includes a first detection layer that detects the boundary of the object and a second detection layer that detects the object of a given shape,
   wherein the plurality of setting values include a plurality of setting values for the first detection layer and a plurality of setting values for the second detection layer, and
   wherein the second process includes:
   a fourth process in which the arithmetic device calculates a number of nodes of the first detection layer and a weighting coefficient to be set to each of a plurality of nodes of the first detection layer on the basis of the plurality of setting values for the first detection layer; and
   a fifth process in which the arithmetic device calculates a number of nodes of the second detection layer and a weighting coefficient to be set to each of a plurality of nodes of the second detection layer on the basis of the plurality of setting values for the second detection layer.

3. The computer according to claim 2,
   wherein the second detection layer detects the object of the given shape by moving the boundary of the object detected by the first detection layer according to a given movement direction,
   wherein the plurality of setting values for the first detection layer include a first filter set on the basis of frequency characteristics of the image and a first angle that defines types of the boundary of the object,
   wherein the plurality of setting values for the second detection layer include a second filter that defines a given movement direction of the boundary of the object and a second angle that defines a plurality of movement directions,
   wherein, in the fourth process,
   the arithmetic device calculates the number of nodes of the first detection layer on the basis of the first angle, and
   the arithmetic device executes, by using the first angle and the first filter, a rotational operation corresponding to dimensions of the first filter to calculate the weighting coefficient to be set to the each of the plurality of nodes of the first detection layer, and
   wherein, in the fifth process,
   the arithmetic device calculates the number of nodes of the second detection layer on the basis of the second angle, and
   the arithmetic device executes, by using the second angle and the second filter, a rotational operation corresponding to dimensions of the second filter to calculate the weighting coefficient to be set to the each of the plurality of nodes of the second detection layer.

4. The computer according to claim 2,
   wherein the arithmetic device is configured to execute a sixth process of executing a learning process using the constructed neural network and a plurality of pieces of learning data, and updating the model information on the basis of results of the learning process.

5. The computer according to claim 2,
wherein the arithmetic device is configured to executes a process for detecting the object from the inputted image on the basis of the model information.

6. A neural network construction method executed by a computer having an arithmetic device, and a storage device coupled to the arithmetic device,
the neural network being a neural network for executing image processing, and being constituted of a plurality of layers, each of which includes at least one node and including a detection laver that realizes a process for detecting an object in an image, and
the neural network construction method including:
a first step of obtaining, by the arithmetic device, setting information for constructing the neural network including a plurality of setting values relating to characteristics of a boundary of the object and a shape of the object, the plurality of setting values being values for calculating a plurality of hyperparameters of the detection layer;
a second step of constructing, by the arithmetic device, the neural network on the basis of the setting information; and
a third step of generating, by the arithmetic device, model information that manages a structure of the constructed neural network,
wherein the second step including a step of calculating, by the arithmetic device, the plurality of hyperparameters of the detection layer on the basis of the plurality of setting values.

7. The neural network construction method according to claim 6,
wherein the neural network includes a first detection layer that detects the boundary of the object and a second detection layer that detects the object of a given shape,
wherein the plurality of setting values include a plurality of setting values for the first detection layer and a plurality of setting values for the second detection layer, and
wherein the second step includes:
a fourth step of calculating, by the arithmetic device, a number of nodes of the first detection layer and a weighting coefficient to be set to each of a plurality of nodes of the first detection layer on the basis of the plurality of setting values for the first detection layer; and
a fifth step of calculating, by the arithmetic device, a number of nodes of the second detection layer and a weighting coefficient to be set to each of a plurality of nodes of the second detection layer on the basis of the plurality of setting values for the second detection layer.

8. The neural network construction method according to claim 7,
wherein the second detection layer detects the object of the given shape by moving the boundary of the object detected by the first detection layer according to a given movement direction,
wherein the plurality of setting values for the first detection layer include a first filter set on the basis of frequency characteristics of the image and a first angle that defines types of the boundary of the object,
wherein the plurality of setting values for the second detection layer include a second filter that defines a given movement direction of the boundary of the object and a second angle that defines a plurality of movement directions,
wherein the fourth step includes:
a step of calculating, by the arithmetic device, the number of nodes of the first detection layer on the basis of the first angle; and
a step of executing, by the arithmetic device, by using the first angle and the first filter, a rotational operation corresponding to dimensions of the first filter to calculate the weighting coefficient to be set to the each of the plurality of nodes of the first detection layer, and
wherein the fifth step includes:
a step of calculating, by the arithmetic device, the number of nodes of the second detection layer on the basis of the second angle; and
a step of executing, by the arithmetic device, by using the second angle and the second filter, a rotational operation corresponding to dimensions of the second filter to calculate the weighting coefficient to be set to the each of the plurality of nodes of the second detection layer.

9. The neural network construction method according to claim 7, further including:
a step of executing, by the arithmetic device, a learning process using the constructed neural network and a plurality of pieces of learning data; and
a step of updating, by the arithmetic device, the model information on the basis of results of the learning process.

10. A computer system comprising:
a plurality of computers;
a setting unit configured to construct a neural network for executing image processing;
a learning unit configured to execute a learning process of the neural network; and
an image processing unit configured to execute the image processing using the neural network,
the neural network being constituted of a plurality of layers, each of which includes at least one node and including a detection laver that realizes a process for detecting an object in an image, and
the setting unit being configured to execute:
a first process of obtaining setting information for constructing the neural network including a plurality of setting values relating to characteristics of a boundary of the object and a shape of the object, the plurality of setting values being values for calculating a plurality of hyperparameters of the detection layer;
a second process of constructing the neural network on the basis of the setting information; and
a third process of generating model information that manages a structure of the constructed neural network,
wherein the second process including a process of calculating the plurality of hyperparameters of the detection layer on the basis of the plurality of setting values.

11. The computer system according to claim 10,
wherein the plurality of layers include a first detection layer that detects the boundary of the object and a second detection layer that detects the object of a given shape,
wherein the plurality of setting values include a plurality of setting values for the first detection layer and a plurality of setting values for the second detection layer, and
wherein the second process includes:
a fourth process in which the setting unit calculates a number of nodes of the first detection layer and a weighting coefficient to be set to each of a plurality of nodes of the first detection layer on the basis of the plurality of setting values for the first detection layer; and a fifth process in which the setting unit calculates a number of nodes of the second detection layer and a weighting coefficient to be set to each of a plurality of nodes of the second detection layer on the basis of the plurality of setting values for the second detection layer.

12. The computer system according to claim 11,
wherein the second detection layer detects the object of the given shape by moving the boundary of the object detected by the first detection layer according to a given movement direction,
wherein the setting values for the first detection layer include a first filter set on the basis of frequency characteristics of the image and a first angle that defines types of the boundary of the object,
wherein the setting values for the second detection layer include a second filter that defines a given movement direction of the boundary of the object and a second angle that defines a plurality of movement directions,
wherein, in the fourth process,
the setting unit calculates the number of nodes of the first detection layer on the basis of the first angle, and
the setting unit executes, by using the first angle and the first filter, a rotational operation corresponding to dimensions of the first filter to calculate the weighting coefficient to be set to the each of the plurality of nodes of the first detection layer, and
wherein, in the fifth process,
the setting unit calculates the number of nodes of the second detection layer on the basis of the second angle, and
the setting unit executes, by using the second angle and the second filter, a rotational operation corresponding to dimensions of the second filter to calculate the weighting coefficient to be set to the each of the plurality of nodes of the second detection layer.

* * * * *